(12) United States Patent
Walters et al.

(10) Patent No.: US 11,604,896 B2
(45) Date of Patent: *Mar. 14, 2023

(54) SYSTEMS AND METHODS TO IMPROVE DATA CLUSTERING USING A META-CLUSTERING MODEL

(71) Applicant: CAPITAL ONE SERVICES, LLC, McLean, VA (US)

(72) Inventors: Austin Walters, Savoy, IL (US); Jeremy Goodsitt, Champaign, IL (US); Anh Truong, Champaign, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/889,363

(22) Filed: Jun. 1, 2020

(65) Prior Publication Data
US 2020/0293427 A1 Sep. 17, 2020

Related U.S. Application Data

(63) Continuation of application No. 16/503,428, filed on Jul. 3, 2019, now Pat. No. 10,671,884.
(Continued)

(51) Int. Cl.
*G06F 21/62* (2013.01)
*G06N 20/00* (2019.01)
(Continued)

(52) U.S. Cl.
CPC ............ *G06F 21/6254* (2013.01); *G06F 8/71* (2013.01); *G06F 9/54* (2013.01); *G06F 9/541* (2013.01);
(Continued)

(58) Field of Classification Search
CPC ... G06F 9/541; G06F 8/71; G06F 9/54; G06F 9/547; G06F 11/3608; G06F 11/3628;
(Continued)

(56) References Cited

U.S. PATENT DOCUMENTS 8,732,173 B2 5/2014 Mizuguchi
9,367,814 B1 6/2016 Lewis
(Continued)

OTHER PUBLICATIONS

Determining the number of clusters in a data set, Wikipedia, 5 pages, https://en.wikipedia.org/wiki/determining_the_number_of_clusters_in_a_data_set. Accessed Jul. 3, 2019.

*Primary Examiner* — Michael S Osinski
(74) *Attorney, Agent, or Firm* — Finnegan, Henderson, Farabow, Garrett & Dunner, LLP

(57) ABSTRACT

Systems and methods for clustering data are disclosed. For example, a system may include one or more memory units storing instructions and one or more processors configured to execute the instructions to perform operations. The operations may include receiving data from a client device and generating preliminary clustered data based on the received data, using a plurality of embedding network layers. The operations may include generating a data map based on the preliminary clustered data using a meta-clustering model. The operations may include determining a number of clusters based on the data map using the meta-clustering model and generating final clustered data based on the number of clusters using the meta-clustering model. The operations may include and transmitting the final clustered data to the client device.

20 Claims, 10 Drawing Sheets

Related U.S. Application Data

(60) Provisional application No. 62/694,968, filed on Jul. 6, 2018.

(51) Int. Cl.

| | |
|---|---|
| *G06F 9/54* | (2006.01) |
| *G06F 17/16* | (2006.01) |
| *G06N 3/04* | (2006.01) |
| *G06F 11/36* | (2006.01) |
| *G06N 3/08* | (2006.01) |
| *G06N 5/04* | (2006.01) |
| *G06F 17/15* | (2006.01) |
| *G06T 7/194* | (2017.01) |
| *G06T 7/254* | (2017.01) |
| *G06T 7/246* | (2017.01) |
| *G06F 16/2455* | (2019.01) |
| *G06F 16/22* | (2019.01) |
| *G06F 16/28* | (2019.01) |
| *G06F 16/906* | (2019.01) |
| *G06F 16/93* | (2019.01) |
| *G06F 16/903* | (2019.01) |
| *G06F 16/9038* | (2019.01) |
| *G06F 16/9032* | (2019.01) |
| *G06N 3/088* | (2023.01) |
| *G06F 16/25* | (2019.01) |
| *G06F 16/335* | (2019.01) |
| *G06F 16/242* | (2019.01) |
| *G06F 16/248* | (2019.01) |
| *G06F 30/20* | (2020.01) |
| *G06F 40/166* | (2020.01) |
| *G06F 40/117* | (2020.01) |
| *G06F 40/20* | (2020.01) |
| *G06F 8/71* | (2018.01) |
| *G06F 17/18* | (2006.01) |
| *G06F 21/55* | (2013.01) |
| *G06F 21/60* | (2013.01) |
| *G06K 9/62* | (2022.01) |
| *G06N 7/00* | (2023.01) |
| *G06Q 10/04* | (2023.01) |
| *G06T 11/00* | (2006.01) |
| *H04L 9/40* | (2022.01) |
| *H04L 67/306* | (2022.01) |
| *H04L 67/00* | (2022.01) |
| *H04N 21/234* | (2011.01) |
| *H04N 21/81* | (2011.01) |
| *G06N 5/00* | (2023.01) |
| *G06N 5/02* | (2023.01) |
| *G06V 10/70* | (2022.01) |
| *G06V 10/98* | (2022.01) |
| *G06V 30/194* | (2022.01) |
| *G06V 30/196* | (2022.01) |

(52) U.S. Cl.
CPC .......... *G06F 9/547* (2013.01); *G06F 11/3608* (2013.01); *G06F 11/3628* (2013.01); *G06F 11/3636* (2013.01); *G06F 16/2237* (2019.01); *G06F 16/2264* (2019.01); *G06F 16/248* (2019.01); *G06F 16/2423* (2019.01); *G06F 16/24568* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/906* (2019.01); *G06F 16/9038* (2019.01); *G06F 16/90332* (2019.01); *G06F 16/90335* (2019.01); *G06F 16/93* (2019.01); *G06F 17/15* (2013.01); *G06F 17/16* (2013.01); *G06F 17/18* (2013.01); *G06F 21/552* (2013.01); *G06F 21/60* (2013.01); *G06F 21/6245* (2013.01); *G06F 30/20* (2020.01); *G06F 40/117* (2020.01); *G06F 40/166* (2020.01); *G06F 40/20* (2020.01); *G06K 9/6215* (2013.01); *G06K 9/6218* (2013.01); *G06K 9/6227* (2013.01); *G06K 9/6231* (2013.01); *G06K 9/6232* (2013.01); *G06K 9/6253* (2013.01); *G06K 9/6256* (2013.01); *G06K 9/6257* (2013.01); *G06K 9/6262* (2013.01); *G06K 9/6265* (2013.01); *G06K 9/6267* (2013.01); *G06K 9/6269* (2013.01); *G06K 9/6277* (2013.01); *G06N 3/04* (2013.01); *G06N 3/0445* (2013.01); *G06N 3/0454* (2013.01); *G06N 3/08* (2013.01); *G06N 3/088* (2013.01); *G06N 5/00* (2013.01); *G06N 5/02* (2013.01); *G06N 5/04* (2013.01); *G06N 7/00* (2013.01); *G06N 7/005* (2013.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *G06V 10/768* (2022.01); *G06V 10/993* (2022.01); *G06V 30/194* (2022.01); *G06V 30/1985* (2022.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01); *G06T 2207/10016* (2013.01); *G06T 2207/20081* (2013.01); *G06T 2207/20084* (2013.01)

(58) Field of Classification Search
CPC ............ G06F 11/3636; G06F 16/2237; G06F 16/2264; G06F 16/2423; G06F 16/24568; G06F 16/248; G06F 16/254; G06F 16/258; G06F 16/283; G06F 16/285; G06F 16/288; G06F 16/335; G06F 16/90332; G06F 16/90335; G06F 16/9038; G06F 16/906; G06F 16/93; G06F 17/15; G06F 17/16; G06F 17/18; G06F 21/552; G06F 21/60; G06F 21/6245; G06F 21/6254; G06F 30/20; G06F 40/117; G06F 40/166; G06F 40/20; G06F 11/3684; G06F 11/3688; G06F 16/215; G06F 16/35; G06K 9/6215; G06K 9/6218; G06K 9/6227; G06K 9/6231; G06K 9/6232; G06K 9/6253; G06K 9/6256; G06K 9/6257; G06K 9/6262; G06K 9/6265; G06K 9/6267; G06K 9/6269; G06K 9/6277; G06N 3/04; G06N 3/0445; G06N 3/0454; G06N 3/08; G06N 3/088; G06N 5/00; G06N 5/02; G06N 5/04; G06N 7/00; G06N 7/005; G06N 20/00; G06N 3/084; G06N 20/10; G06N 5/022; G06N 3/0472; G06N 5/003; G06N 20/20; G06Q 10/04; G06T 7/194; G06T 7/246; G06T 7/248; G06T 7/254; G06T 11/001; G06T 2207/10016; G06T 2207/10024; G06T 2207/20081; G06T 2207/20084; G06V 10/768; G06V 10/993; G06V 30/194; G06V 30/1985; H04L 63/1416; H04L 63/1491; H04L 67/306; H04L 67/34; H04N 21/23412; H04N 21/8153

See application file for complete search history.

(56) References Cited

U.S. PATENT DOCUMENTS

| | | | |
|---|---|---|---|
| 9,465,857 B1 | 10/2016 | Deland | |
| 10,043,095 B2* | 8/2018 | Yang | G06N 3/063 |
| 10,445,341 B2 | 10/2019 | Matteson | |
| 10,489,690 B2 | 11/2019 | Jin | |
| 10,915,798 B1* | 2/2021 | Zhang | G06V 40/20 |
| 11,094,329 B2* | 8/2021 | Park | G06N 3/08 |
| 11,347,969 B2* | 5/2022 | Lawrence | G06K 9/6257 |
| 2003/0169919 A1 | 9/2003 | Ikeda | |
| 2008/0010304 A1 | 1/2008 | Vempala | |
| 2013/0156294 A1 | 6/2013 | Wei | |
| 2013/0294680 A1 | 11/2013 | Harada | |
| 2014/0052674 A1 | 2/2014 | Aggarwal | |
| 2014/0310208 A1 | 10/2014 | Fasel | |
| 2015/0146974 A1 | 5/2015 | Kato | |
| 2015/0302042 A1 | 10/2015 | Shirai | |
| 2016/0232575 A1 | 8/2016 | Kirti | |
| 2016/0259841 A1 | 9/2016 | Andrew | |
| 2016/0267359 A1 | 9/2016 | Gan | |
| 2016/0335545 A1 | 11/2016 | Qiu | |
| 2017/0026391 A1* | 1/2017 | Abu-Nimeh | G06F 16/24578 |
| 2017/0053409 A1 | 2/2017 | Yamamoto | |
| 2017/0193336 A1* | 7/2017 | Cetintas | G06N 3/08 |
| 2017/0300566 A1 | 10/2017 | Robb | |
| 2018/0089591 A1* | 3/2018 | Zeiler | G06F 3/048 |
| 2018/0101575 A1 | 4/2018 | Oberoi | |
| 2018/0150609 A1 | 5/2018 | Kim | |
| 2018/0189615 A1* | 7/2018 | Kang | G06K 9/6218 |
| 2019/0005313 A1 | 1/2019 | Vemulapalli | |
| 2019/0020967 A1* | 1/2019 | Allen | H04S 7/305 |
| 2019/0057285 A1 | 2/2019 | Hisada | |
| 2019/0102658 A1 | 4/2019 | Wang | |
| 2019/0147336 A1 | 5/2019 | Yu | |
| 2019/0172581 A1 | 6/2019 | Zlotnick | |
| 2019/0212977 A1 | 7/2019 | Sicurelli | |
| 2019/0228268 A1 | 7/2019 | Zhang | |
| 2019/0354810 A1 | 11/2019 | Samel | |
| 2019/0378046 A1 | 12/2019 | Tanaka | |
| 2020/0007931 A1 | 1/2020 | Ho | |
| 2020/0082165 A1* | 3/2020 | Wang | G06K 9/6271 |
| 2020/0356805 A1* | 11/2020 | Sun | G06V 10/40 |
| 2021/0042912 A1* | 2/2021 | Zhao | G06V 10/82 |
| 2021/0049499 A1* | 2/2021 | Ho | G06V 10/764 |
| 2021/0209339 A1* | 7/2021 | You | G06N 3/04 |
| 2021/0339743 A1* | 11/2021 | Shi | G06N 3/08 |
| 2022/0101644 A1* | 3/2022 | Wei | G06V 40/10 |

* cited by examiner

SYSTEMS AND METHODS TO IMPROVE DATA CLUSTERING USING A META-CLUSTERING MODEL

CROSS REFERENCE TO RELATED APPLICATIONS

This application is a continuation of U.S. patent application Ser. No. 16/503,428, filed Jul. 3, 2019, now allowed, which claims the benefit of U.S. Provisional Application No. 62/694,968, filed Jul. 6, 2018. The content of each of the above applications is expressly incorporated herein by reference in its entirety.

BACKGROUND

The need for efficient and effective systems to classify and cluster data arises in many fields, including data management, science, finance, engineering, environmental monitoring, water supply systems, climate studies, health care, and many other areas of human activity. For example, many fields data involve collecting and analyzing large scale, complex datasets at high velocity "big data."). Big data may involve datasets of such vast scale that spotting trends or outcomes requires advanced application of analytic data science or knowledge processing (e.g., artificial intelligence). Classification and clustering needs arise for all types of data (e.g., text data, numeric data, image data, video data, etc.).

Conventional methods may include training machine learning algorithms, including neural network models, to predict or classify data. Conventional approaches typically include training and implementing an individual machine learning model. However, an individual model may reach an inaccurate result because the model may not be well-suited to the information it is attempting to classify, or it may lack appropriate training data (e.g., it may classify inaccurately a photo of a cat as a "rat."). Further, an individual model may reach a sub-optimal result by failing to recognize distinguishing features of a data sample that indicate the data sample optimally belongs in an additional category or a sub-category (e.g., by sub-optimally classifying an image of a hairless cat as a "cat").

Some conventional approaches may include training and implementing a plurality of models to classify and/or cluster data. For example, a data system may train and implement different models individually to classify and/or cluster data. However, training models individually may inefficiently waste resources. Such an approach may fail to take advantage of comparative strengths of various models. For example, one model may perform better when classifying faces, while another performs better when classifying animals, but when classifying images that includes humans and animals, a conventional approach may simply train the two models individually to cluster data without allowing the models to learn from each other.

For example, as shown in FIG. 2, a conventional approach to classifying a data sample may include using classification models that comprise machine learning models or other classification models. One or more classification models (e.g., classification models 204a, 204b, 204c, 204d, and 204n), may be configured to receive input data (e.g., an input data sample 202 such as an image of a hairless cat) and return corresponding classification results (classification results 206a, 206b, 206c, 206d, and 206n). A classification result may include a label (e.g., cat, dog, rat, etc.). Classification models may be configured to perform object recognition and classification to detect and classify, for example, animals in images. Classification models may use similar or may use different classification algorithms from each other.

FIG. 2 illustrates problems and challenges associated with conventional approaches to data classification and data clustering. For example, classification models of method 200 may produce different classification results for the same data sample, resulting in misclassification inaccurate classification) or sub-optimal classification. A system may be unable to determine which classification results are accurate and may waste resources by training classification models with sub-optimal training conditions.

As shown, some classification models of FIG. 2 inaccurately classify the input image as depicting a rat or a naked mole rat. In some cases, classification models may sub-optimally classify the input image as cat but not the more optimal classification of a hairless cat. In the conventional approach depicted in FIG. 2, it may be inefficient or infeasible to train the plurality of models to generate an accurate and optimal classification. Further, traditional metrics of classification model output, such as a confidence interval, may provide, incomplete information or may not correlate with a true classification. That is, traditional metrics may not indicate how well a classification model performs as compared to another classification model. In the example of FIG. 2, each classification model may report a high confidence level, for example, but only classification models 206a and 206d produce accurate results, and classification model 206a performs sub-optimally as compared to classification model 206d. Thus, the high confidence level may not reflect a true classification and it may be difficult to compare results.

Inaccurate and/or suboptimal classifications may arise in conventional approaches to classification. In conventional approaches, a classification model may be trained individually to meet performance criteria when learning to classify data (e.g., trained to minimize a loss function). Classification errors may arise, for example, when an individual classification model converges on a suboptimal number of classification categories during model training. During training, an classification model may reach a local minimum but fail to reach a global minimum of an optimization function. Some classification model may perform better than other classification models on some data samples. Hence, there is a need for unconventional approaches that improve the accuracy and efficiency of individual classification model classification results by learning from and incorporating the results of a plurality of classification models.

Therefore, conventional approaches suffer from inaccuracies and wasteful inefficient use of computing resources. In view of the shortcomings and problems with conventional approaches to clustering data, there is a need for unconventional approaches that improve the accuracy and efficiency of classification and, clustering results by learning from and incorporating the results of a plurality of models.

SUMMARY

The disclosed embodiments provide unconventional methods and systems for clustering data. Embodiments consistent with the present disclosure are rooted in computer technology and may include implementing a meta-clustering model to reduce the dimensionality of clustered data, leading to improved accuracy and efficiency. Embodiments consistent with the present disclosure may include using a meta-clustering to cluster data generated by a plurality of embedding network layers that implement a plurality of clustering methods. An embedding network may include a plurality of embedding network layers. Embedding network layers may include connected neural network nodes, consistent with disclosed embodiments. An embedding network layer may include one or more machine learning models such as a classification model. An embedding layer may be configured to convert a data sample into a latent space. Embedding layer output may include a plurality of data points in a latent space. In some embodiments, the meta-clustering model may quickly identify an optimal number of data clusters, thereby avoiding costly resource use during model training of individual embedded models which otherwise may need to reach the optimal solution independently or which otherwise may fail to reach an optimal solution. In some embodiments, a meta-clustering model may determine that an additional class (i.e., cluster) better-describes data. In addition, embodiments may provide enhanced interpretability of model output by clustering at a layer-by-layer level. Accordingly, the embodiments provide advantages by increasing accuracy, generating interpretable output, lowering costs, and reducing resource use when clustering data.

Consistent with the present embodiments, a system for clustering data is disclosed. The system may include one or more memory units storing instructions and one or more processors configured to execute the instructions to perform operations. The operations may include receiving data from a client device and generating, using a plurality of embedding network layers, preliminary clustered data based on the received data. The operations may include generating, using a meta-clustering model, a data map based on the preliminary clustered data. The operations may include determining, using the meta-clustering model, a number of clusters based on the data map and generating, using the meta-clustering model, final clustered data based on the number of clusters. The operations may include transmitting the final clustered data to the client device.

Consistent with the present embodiments, a method for clustering data is disclosed. The method may include receiving data from a client device and generating, using a plurality of embedding network layers, preliminary clustered data based on the received data. The method may include generating, using a meta-clustering model, a data map based on the preliminary clustered data. The method may include determining, using the meta-clustering model, a number of clusters based on the data map and generating, using the meta-clustering model, final clustered data based on the number of clusters. The method may include transmitting the final clustered data to the client device.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1:
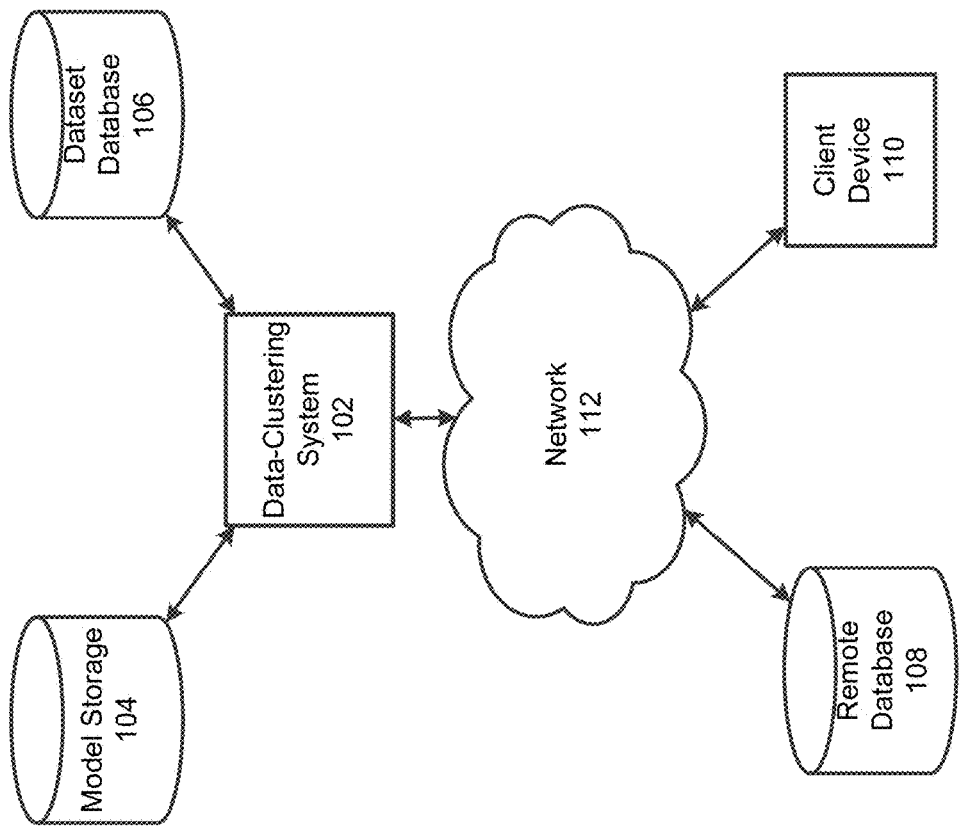
FIG. 1 depicts an exemplary system for clustering data, consistent with disclosed embodiments.
Figure 2:
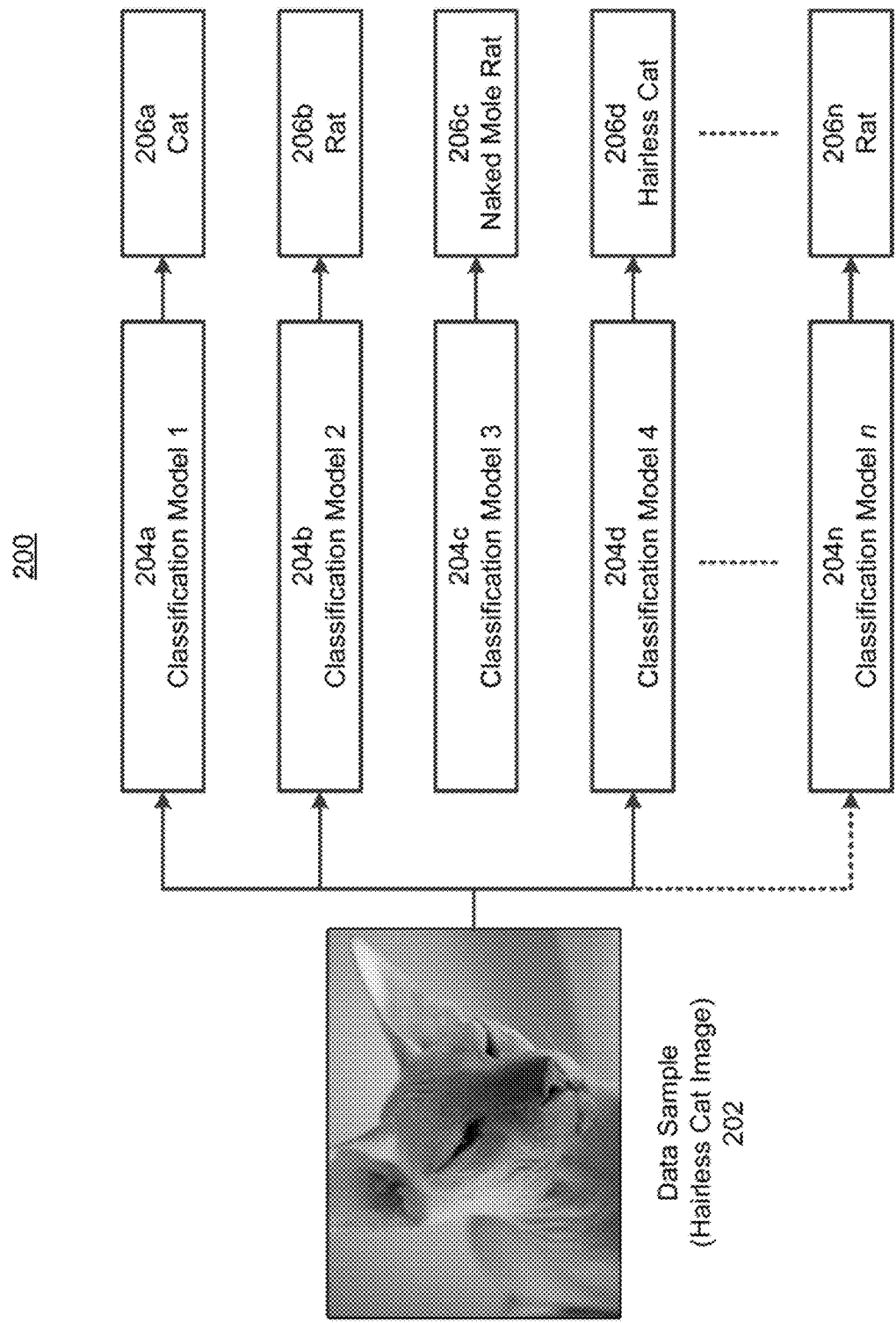
FIG. 2 illustrates a method for classifying a data sample.

Consistent with disclosed embodiments, systems and methods to cluster data are disclosed. Embodiments consistent with the present disclosure may include using a plurality of embedding network layers to cluster data and using meta-clustering model to optimize clustering based on embedding network layer output. As explained above, disclosed systems and methods provide accuracy, efficiency, and cost advantages over conventional approaches to clustering data.

Embodiments consistent with the present disclosure may include data (i.e., datasets). Datasets may comprise actual data reflecting real-world conditions, events, and/or measurements. In some embodiments, disclosed systems and methods may fully or partially involve synthetic data (e.g., anonymized actual data or fake data). Datasets may involve time series data, numeric data, text data, and/or image data. For example, datasets may include transaction data, financial data, demographic data, public data, government data, environmental data, traffic data, network data, transcripts of video data, genomic data, proteomic data, and/or other data.

Datasets may have a plurality of dimensions, the dimensions corresponding to variables. For example, a dataset may include a time series of 3-dimensional spatial data. Datasets of the embodiments may have any number of dimensions. As an illustrative example, datasets of the embodiments may include time series data with dimensions corresponding to longitude, latitude, cancer incidence, population density, air quality, and water quality. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (i.e., structure), including a data type, key-value pair, label, metadata, field, relationship, view, index, package, procedure, function, trigger, sequence, synonym, link, directory, queue, or the like. Datasets of the embodiments may contain foreign keys, i.e., data elements that appear in multiple datasets and may be used to cross-reference data and determine relationships between datasets. Foreign keys may be unique (e.g., a personal identifier) or shared (e.g., a postal code). Datasets of the embodiments may be "clustered," i.e., a group of datasets may share common features, such as overlapping data, shared statistical properties, etc. Clustered datasets may share hierarchical relationships (i.e., data lineage).

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 depicts exemplary system 100 for clustering data, consistent with disclosed embodiments. As shown, system 100 may include a data-clustering system 102, a model storage 104, a dataset database 106, a remote database 108, and a client device 110. Components of system 100 may be connected to each other via a network 112.

In some embodiments, aspects of system 100 may be implemented on one or more cloud services designed to generate ("spin-up") one or more ephemeral container instances (e.g., AMAZON LAMBDA instances) in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of data-clustering systems, model storages, dataset databases, remote databases, client devices and/or networks. In addition, system 100 may further include other components or devices not depicted that perform or assist in the performance of one or more processes, consistent with the disclosed embodiments. The exemplary components and arrangements shown n FIG. 1 are not, intended to limit, the disclosed embodiments.

Data-clustering system 102 may include a computing device, a computer, a server, a server cluster, a plurality of server clusters, and/or a cloud service, consistent with disclosed embodiments. Data-clustering system 102 may include one or more memory units and one or more processors configured to perform operations consistent with disclosed embodiments. Data-clustering system 102 may include computing systems configured to generate, receive, retrieve, store, and/or provide data models and/or datasets, consistent with disclosed embodiments. Data-clustering system 102 may include computing systems configured to generate and train models, consistent with disclosed embodiments Data-clustering system 102 may be configured to receive data from, retrieve data from, and/or transmit data to other components of system 100 and/or computing components outside system 100 (e.g., via network 112). Data-clustering system 102 is disclosed in greater detail below (in reference to FIG. 5).

Model storage 104 may be hosted on one or more servers, one or more clusters of servers, or one or more cloud services. Model storage 104 may be connected to network 112 (connection not shown). In some embodiments, model storage 104 may be a component of data-clustering system 102 (not shown).

Model storage 104 may include one or more databases configured to store data models (e.g., machine-learning models or statistical models) and descriptive information of data models. Model storage 104 may be configured to provide information regarding available data models to a user or another system. Databases may include cloud-based data bases, cloud-based, buckets, or on-premises databases. The information may include model information such as the type and/or purpose of a model and any measures of classification error. Model storage 104 may include one or more databases configured to store indexed and, clustered models for use by data-clustering system 100. For example, model storage 104 may store models associated with generalized representations of those models (e.g., neural network architectures stored in TENSORFLOW or other standardized formats). Databases may include cloud-based databases (e.g., AMAZON WEB SERVICES RELATIONAL DATABASE SERVICE) or on-premises databases.

Dataset database 106 may include one or more databases configured to store data for use by system 100, consistent with disclosed embodiments. In some embodiments, dataset database may be configured to store datasets and/or one or more dataset indexes, consistent with disclosed embodiments. Dataset database 106 may include a cloud-based database (e.g. AMAZON WEB SERVICES RELATIONAL DATABASE SERVICE) or an on-premises database. Dataset database 106 may include datasets, model data (e.g., model parameters, training criteria, performance metrics, etc.), and/or other data, consistent with disclosed embodiments. Dataset database 106 may include data received from one or more components of system 100 and/or computing components outside system 100 (e.g., via network 112). In some embodiments, dataset database 106 may be a component of data-clustering system 102 (not shown).

Remote database 108 may include one or more databases configured to store data for use by system 100, consistent with disclosed embodiments. Remote database 108 may be configured to store datasets and/or one or more dataset indexes, consistent with disclosed embodiments, Remote database 108 may include a cloud-based database (e.g., AMAZON WEB SERVICES RELATIONAL DATABASE SERVICE) or an on-premises database.

Client device 110 may include one or more memory units and one or more processors configured to perform operations consistent with disclosed embodiments. In some embodiments, client device 110 may include hardware, software, and/or firmware modules. Client device 110 may be a user device. Client device 110 may include a mobile device, a tablet, a personal computer, a terminal, a kiosk a server, a server cluster, a cloud service, a storage device, a specialized device configured to perform methods according to disclosed embodiments, or the like.

At least one of data-clustering system 102, model storage 104, dataset database 106, remote database 108, or client device 110 may be connected to network 112. Network 112 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 112 may be connected to other networks (not depicted in FIG. 1) to connect the various system components to each other and/or to external systems or devices. In some embodiments, network 112 may be a secure network and require a password to access the network.

Figure 3:
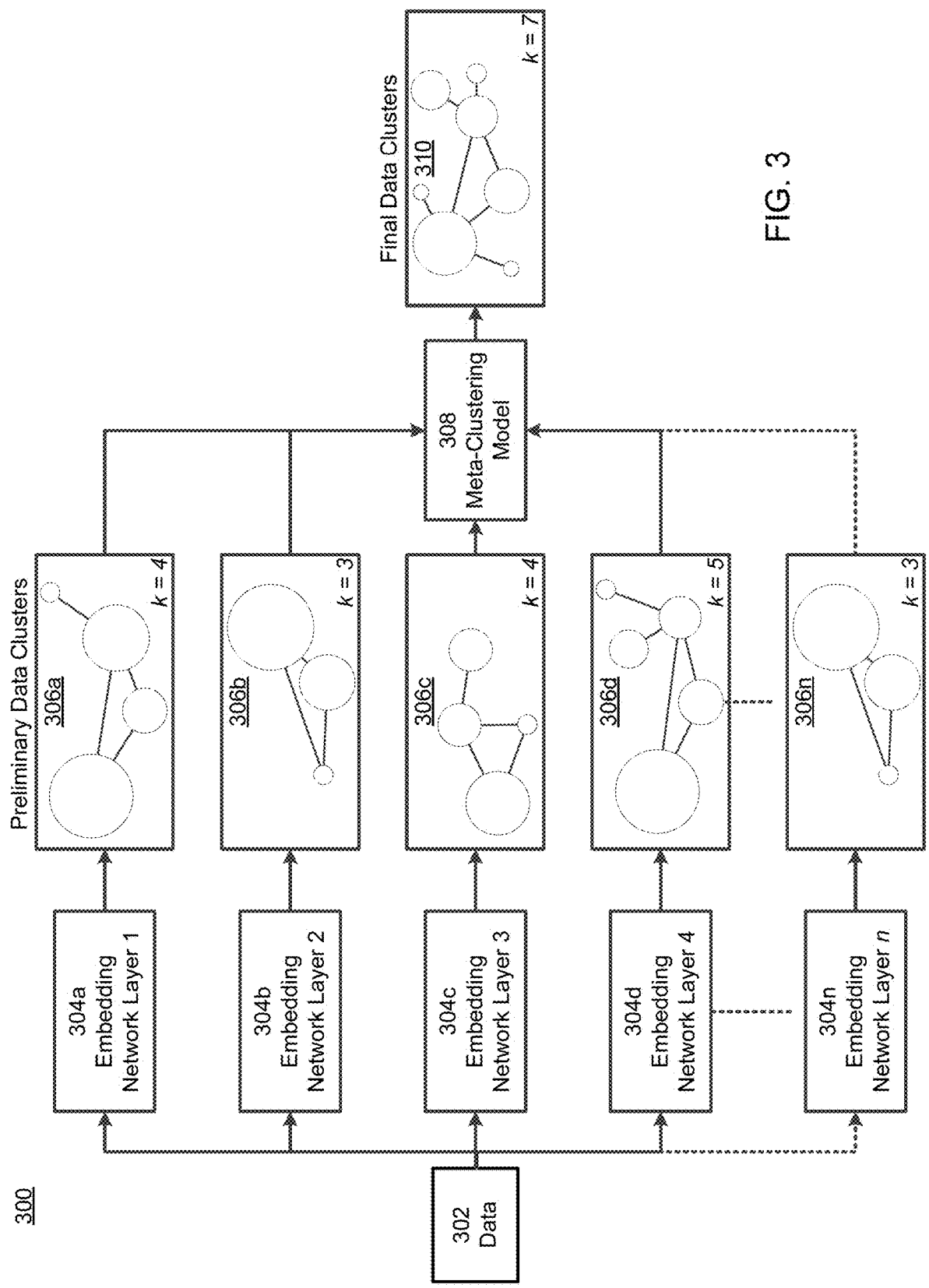
FIG. 3 illustrates a method for clustering data using a meta-clustering model, consistent with disclosed embodiments.

FIG. 3 illustrates method 300 for clustering data using a meta-clustering model, consistent with disclosed embodiments. As compared to conventional approaches, method 300 may produce more accurate results with greater efficiency. As shown, method 300 may include using a meta-clustering model 308 to generate a final data cluster based on preliminary data clusters (i.e., preliminary clustered data) which were generated by a plurality of embedding network layers that implement a plurality of clustering methods. By learning from a plurality of individually-trained models and/or embedding network layers, meta-clustering model 308 may advantageously identify more accurate classifications and/or clusters where traditional metrics, such as confidence levels, may provide incomplete information. Clusters may include information relating to nodes of an embedding network layer. For example, a cluster may include a vector of weights associated with nodes of a layer. A cluster may be grouped by an aspect of a latent space generated by an embedding network layer based on a data sample. In some embodiments, meta-clustering model 308 may reduce the dimensionality of clustered data produced by embedding layers, leading to improved accuracy and efficiency. Meta-clustering model 308 may quickly identify an optimal number of data clusters. Accordingly, method 300 provides advantages by increasing accuracy, lowering costs, and reducing resource use when clustering data. FIG. 3 is provided for purposes of illustration only is not limiting on the embodiments.

Referring to FIG. 3 in greater detail, method 300 may include using a plurality of embedding network layers 304a, 304b, 304c, 304d, and 304n to classify and cluster data 302. Method 300 may include generating a plurality of preliminary data clusters 306a, 306b, 306c, 306d, and 306n corresponding to embedding network layers 304a, 304b, 304c, 304d, and 304n. Method 300 may include using meta-clustering model 308 to generate final data clusters 310 (i.e., final clustered data) based on preliminary data clusters. As one of skill in the art will appreciate, method 300 may include any number of embedding network layers, data, preliminary data clusters, meta-clustering models, and/or final data clusters, including more or fewer than those depicted in FIG. 3.

Data 302 may include any kind of data (e.g., text data, image data, numeric data, time series data, etc.) Data 302 may include multi-dimensional data Data 302 may be organized according to any data schema. Data 302 may include a plurality of data samples (e.g., a plurality of image files, a plurality of video files, a plurality text files, a plurality of data columns, etc.). Data 302 may include a number of dimensions (e.g., two-dimensional data, three-dimensional data, four-dimensional data, etc.).

Embedding network layers 304a, 304b, 304c, 304d and 304n may be configured to accept data as input and return a data classification and/or data clusters as output. As shown, embedding network layers 304a, 304b, 304c, 304d and 304n may be configured to generate a plurality of corresponding preliminary data clusters 306a, 306b, 306c, 306d, and 306n based on data 302. Generating preliminary data clusters may include sampling data 302. Generating preliminary clusters may include generating clusters based on node output of a layer (e.g., a vector of weights, activation function values, etc.). Embedding network layers 304a, 304b, 304c, 304d may include any type of embedding network as described herein and/or any other machine learning model.

Preliminary data clusters 306a, 306b, 306c, 306d, and 306n may include data clusters represented as a node-edge diagrams in FIG. As shown, FIG. 3 represents nodes as discs. A node may include data samples that share a classification (e.g., a tag) and the size of the disc may indicate a relative size the node (i.e., the relative amount of data that belongs to the node). FIG. 3 represents edges as lines between nodes. An edge may be based on a relationship between nodes. For example, edge data may be based on a similarity metric between data samples, on a hierarchical relationship (e.g., a data lineage, a parent-child relationship), and/or on any other relationship. The distance between nodes represent aspects of data relationships between the nodes (e.g., the strength of a relationship, the similarity of data, etc.). Although FIG. 3 depicts node-edge diagrams, embodiments may include data clusters organized and/or represented according to any known classification method (e.g., data table, a relational database, a tree diagram, or a vector diagram). In some embodiments, a node of a cluster may include a data sample grouped by an aspect of a latent space of a layer. In some embodiments, preliminary data clusters may have a number of dimensions (e.g., two-dimensions three-dimensions, four-dimensions, etc.). A number of dimensions of preliminary data clusters may be the same as a number of dimensions of data 302. In some embodiments, one or more layers of an embedding network may generate preliminary data clusters having the same number of dimensions.

As shown by way of example, individual ones of preliminary data clusters 306a, 306b, 306c, 306d, and 306n have a corresponding number of clusters, k, whose value is 4, 3, 4, 5, and 3, respectively. Hence, the number of clusters generated by one embedding network layer may be the same as or different from another embedding network layer.

In addition, individual ones of preliminary data clusters 306a, 306b, 306c, 306d, and 306n may generate node-edge relationships which may differ from or which may be the same as one another. For example, embedding network layers 304b and 304n classify data samples of data 302 in the same way as each other and generate the same edge relationships between data samples to generate identical preliminary data clusters 306b and 306n. As another example, preliminary data clusters 306a, 306b, 306c, and 306d may differ from each other because their respective embedding networks generate different classifications (nodes) and different edge relationships from each other. As compared to the illustration of FIG. 3, method 300 may include other preliminary data dusters which may be the same or different from each other.

Meta-clustering model 308 may include a machine learning model. For example, meta-clustering model 308 may include a deep learning model, a neural network model, an RNN, a CNN, a random forest model, a Support Vector Machine (SVM) model, a Density-based spatial clustering of applications with noise (DBSCAN) model, a k-means clustering model, a distribution-based clustering model, a k-medoids model, and/or any other type of machine learning model. Meta-clustering model 308 may be trained to generate data clusters based on data clusters produced by embedding network layers.

In some embodiments, meta-clustering model 308 may be configured to encode preliminary data clusters 306a, 306b, 306c, 306d, and 306n. For example, meta-clustering model 308 may perform a principal component analysis (PCA), an independent component analysis (ICA), a non-negative matrix factorization method (NMF), a Factor Analysis (FA), and/or any other algorithm to reduce dimensionality of latent variable generated by a model based on data samples of preliminary data clusters 306a, 306b, 306c, 306d, and 306n. Encoding may include implementing an autoencoder (e.g., a variational autoencoder) model. By encoding preliminary data clusters, meta-clustering model 308 may reduce the complexity of the preliminary data clusters and more efficiently produce final data clusters 310.

In some embodiments, meta-clustering model 308 may be configured to generate a data map of data 302 based on preliminary data clusters 306a, 306b, 306c, 306d, and 306n. In some embodiments, generating a data map may be unsupervised. In some embodiments, generating a data map may include tracking data samples in a plurality of preliminary data clusters and determining relationships between the data samples. For example, meta-clustering model 308 may learn to predict the frequency with which two or more data samples appear in a same preliminary data cluster and generate a data map based on the predictions. In some embodiments, meta-clustering model 308 may generate a data map based on encoded preliminary-data-clusters (e.g., based on principal components of the preliminary data clusters). A data map may include a plurality of data points in a latent space representing transitions of a data sample between the embeddings. An embedding layer may convert a data sample into a latent space, and a data map may include a visual representation of a data conversion into a latent space. A data map may be based on weights of an embedding layer.

In some embodiments, generating a data map may be supervised. For example, generating a data map may include providing data samples to a user and receiving user feedback. Meta-clustering model 308 may identify a conflict between preliminary data clusters (e.g., embedding network layer 304a may classify the same data sample differently from embedding network layer 304b), and meta-clustering model 308 may request user feedback based on the conflict.

In some embodiments, meta-clustering model 308 may determine a performance metric of one or more embedding network layers. For example, meta-clustering model may determine a performance metric of an embedding network layer based on an intra-cluster variance of preliminary data clusters generated by the embedding network layer. In some embodiments, generating a data map may be based on a performance metric.

In some embodiments, meta-clustering model 308 may determine a number of clusters based on a data map and/or a performance metric. Determining a number of clusters may be based on relationships (e.g., edge relationships) between data clusters. In some embodiments, meta-clustering model 308 is trained to determine a number of clusters that optimizes a property of clustered data (e.g., trained to optimize a measure of variance of a cluster a ratio of intra-cluster variance to inter-cluster variance, etc.) Determining a number of data clusters may include implementing methods such as a k-means algorithm, a k-medoids algorithm, an elbow method, an X-means clustering method, an information criterion approach, a silhouette method, a cross-validation method, a method based on a kernel matrix, and/or any other methods of determining a number of clusters in data. In some embodiments, meta-clustering model 308 limits and/or reduces a number of layers of an embedding network to lead to greater processing efficiencies.

In some embodiments, meta-clustering model 308 may generate final data dusters 310. In some embodiments, meta-clustering model 308 may generate final data clusters based on a data map (e.g., the final data clusters 310 may be the same as the data map). In some embodiments, generating final data clusters 310 may include updating one or more embedding network layers by training the embedding network layers based on a number of clusters (e.g., a number of clusters determined based on a data map). In the example of FIG. 3, a final data cluster has a number of final data clusters, k, whose value is 7. In some embodiments, the number of final data clusters may be based on a relationship between clusters of preliminary data clusters. In some embodiments, a number of final data clusters, k, may be fixed at one greater than the maximum number of clusters in a plurality of preliminary data clusters. In some embodiments, generating final data dusters 310 may include generating updated data clusters using one or more updated embedding network layers. In some embodiments, final data clusters 310 may include an updated data cluster generated by an updated embedding network layer. In some embodiments, final data clusters 310 may include a number of dimensions that is greater than the number of dimensions of one or more of preliminary data clusters 306a, 306b, 306c, and/or 306d. In some embodiments, final data clusters 310 may include a number of dimensions equal to n times a number of dimensions of one or more preliminary data clusters, where n may be a number of embedding network layers. As an example, an embedding network may have 5 layers (n=5), data 302 may and preliminary data clusters 306a, 306b, 306c, and/or 306d, may have three-dimensions, and final data clusters may have 15 dimensions (i.e., five layers times three dimensions).

In some embodiments generating final data clusters 310 may include repeatedly updating one or more embedding network layers until a performance metric of the one or more embedding network layers is satisfied. During individual rounds of training of an embedding network layer, meta-clustering model 308 may determine a number of clusters and train the embedding network layer based on the determined number of clusters (e.g., by specifying the number of clusters as a model parameter of the embedding network layer). In this way, meta-clustering model 308 may be trained to accept one or more preliminary clusters, generate a data map, and quickly converge on an optimal solution by determining an optimal number of clusters. Accordingly, in subsequent implementations, a trained meta-clustering model 308 may quickly and efficiently generate accurate final data clusters 310.

Figure 4:
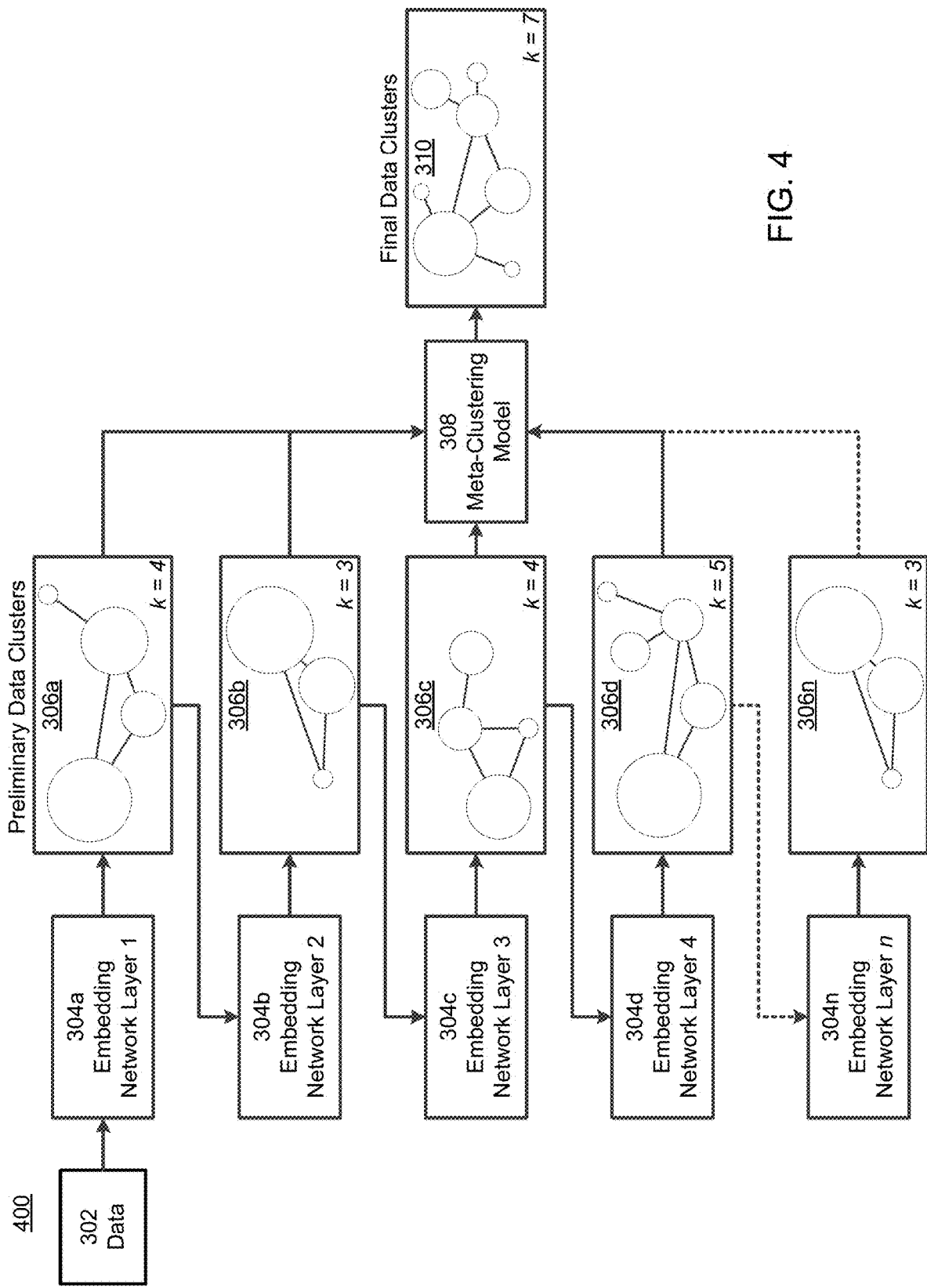
FIG. 4 illustrates a method for clustering data using a meta-clustering model, consistent with disclosed embodiments.

FIG. 4 illustrates method 400 for clustering data using a meta-clustering model, consistent with disclosed embodiments. As described above in reference to FIG. 3, method 400 may include using a plurality of embedding network layers 304a, 304b, 304c, 304d, and 304n to classify and cluster data 302. Method 400 may include encoding data 302 prior to classification, consistent with disclosed embodiments. Method 400 may include generating a plurality of preliminary data clusters 306a, 306b, 306c, 306d, and 306n corresponding to embedding network layers 304a, 304b, 304c, 304d, and 304n. Method 400 may include using meta-clustering model 308 to generate final data clusters 310 (i.e., final clustered data) based on preliminary data clusters. As one of skill in the art will appreciate, method 400 may include any number of embedding network layers, data preliminary data clusters, meta-clustering models, and/or final data clusters, including more or fewer than those depicted in FIG. 4. Embedding network layers, data, preliminary data clusters meta-clustering models, and/or final data dusters of FIG. 4 may be configured to perform methods as described above in reference to FIG. 3.

In an embodiment of method 400, embedding network layer outputs comprising clustered data may be passed as inputs to subsequent embedding network layers. For example, embedding network layer 304a may generate preliminary data clusters 306a based on data 302. As shown, an embedding network layer 304b may generate preliminary data clusters 306b based on preliminary data clusters 306a. Further, an embedding network layer 304c may generate preliminary data clusters 306c based on preliminary data clusters 306b. An embedding network layer 304d may generate preliminary data dusters 306d based on preliminary data clusters 306c. In turn, an embedding network layer 304n may generate preliminary data clusters 306n based on preliminary data clusters 306d. Accordingly, in the method of FIG. 4, generating preliminary clustered data based on the received data may include passing an embedding network layer output comprising clustered data to subsequent embedding network layers.

Method 400 may include using meta-model 308 to generate final data clusters 310, updating one or more embedding network layers, and/or generating updated data clusters in a substantially similar manner as described in reference to method 300 (FIG. 3) but with outputs of embedding network layers being passed as inputs to subsequent embedding network layers. For example, meta-model 308 may generate final data clusters 310 based on a data map and/or one or more preliminary data clusters 306a, 306b, 306c, 306d and 306n in substantially the same manner in method 400 as in method 300.

Figure 5:
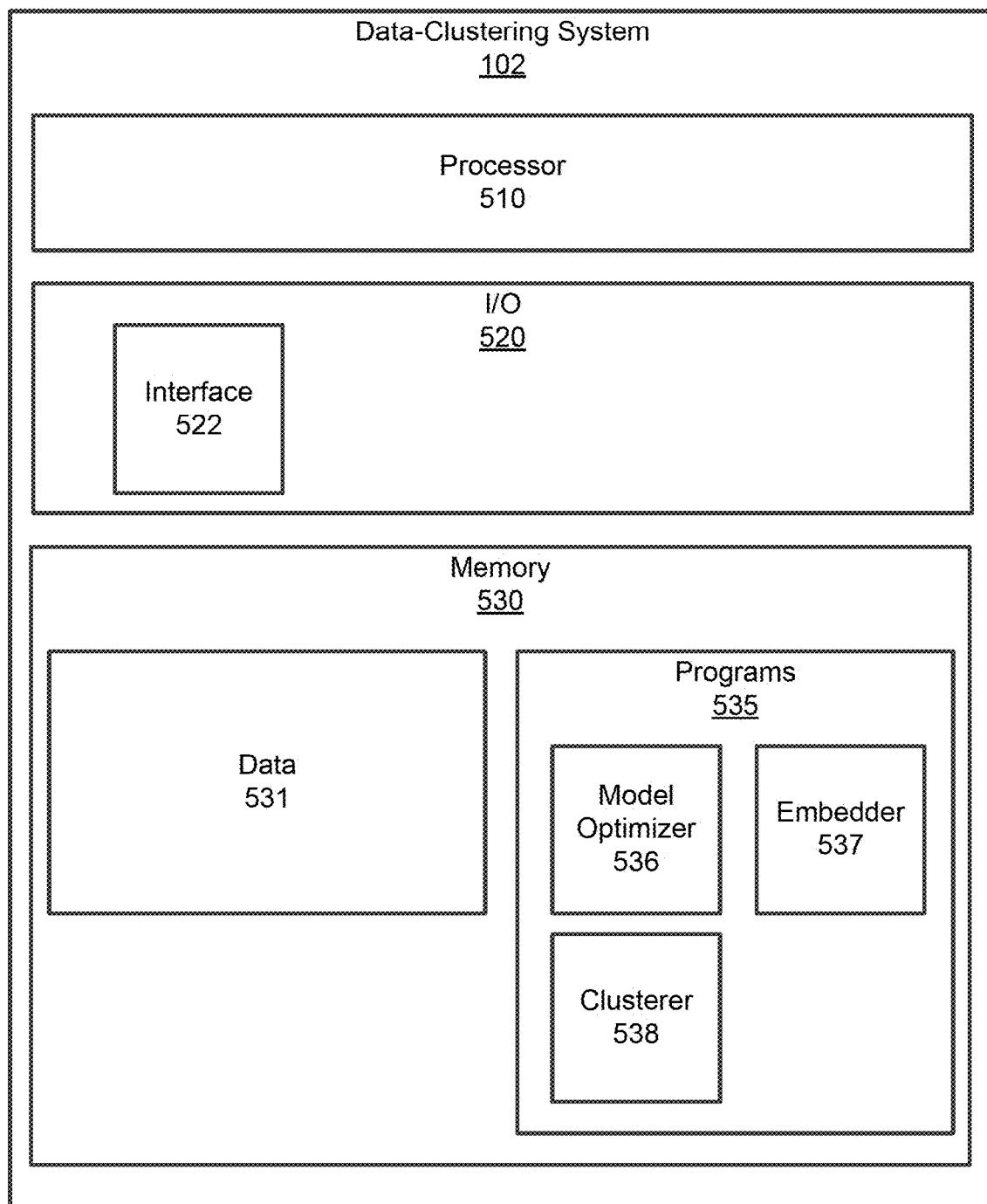
FIG. 5 depicts an exemplary data-clustering system, consistent with disclosed embodiments.

FIG. 5 depicts exemplary data-clustering system 102, consistent with disclosed embodiments. Data-clustering system 102 may include a computing device, a computer, a server, a server cluster, a plurality of clusters, and/or a cloud service, consistent with disclosed embodiments. As shown, data-clustering system 102 may include one or more processors 510, one or more I/O devices 520, and one or more memory units 530. In some embodiments, some or all components of data-clustering system 102 may be hosted on a device, a computer, a server, a cluster of servers, or a cloud service. In some embodiments, data-clustering system 102 may be a scalable system configured to efficiently manage resources and enhance security by provisioning computing resources in response to triggering events and terminating resources after completing a task (e.g., a scalable cloud service that spins up and terminates container instances).

FIG. 5 depicts an exemplary configuration of data-clustering system 102. As will be appreciated by one skilled in the art, the components and arrangement of components included in data-clustering system 102 may vary. For example, as compared to the depiction in FIG. 5, data-clustering system 102 may include a larger or smaller number of processors, I/O devices, or memory units. In addition, data-clustering system 102 may further include other components or devices not depicted that perform or assist in the performance of one or more processes consistent with the disclosed embodiments. The components and arrangements shown in FIG. 5 are not intended to limit the disclosed embodiments, as the components used to implement the disclosed processes and feature may vary.

Processor 510 may comprise known computing processors, including a microprocessor. Processor 510 may constitute a single-core or multiple-core processor that executes parallel processes simultaneously. For example, processor 510 may be a single-core processor configured with virtual processing technologies. In some embodiments, processor 510 may use logical processors to simultaneously execute and control multiple processes. Processor 510 may implement virtual machine technologies, or other known technologies to provide the ability to execute, control, run, manipulate store, etc., multiple software processes, applications, programs, etc. In another embodiment, processor 510 may include a multiple-core processor arrangement (e.g. dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 510 may execute various instructions stored in memory 530 to perform various functions of the disclosed embodiments described in greater detail below. Processor 510 may be configured to execute functions written in one or more known programming languages.

I/O devices 520 may include at least one of a display, an LED a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 520 may be components of an interface 522 (e.g., a user interface).

Interface 522 may be configured to manage interactions between system 100 and other systems using network 112. In some aspects, interface 522 may be configured to publish data received from other components of system 100. This data may be published in a publication and subscription framework (e.g., using APACHE KAFKA), through a network socket, in response to queries from other systems, or using other known methods. Data may be synthetic data, as described herein. As an additional example, interface 522 may be configured to provide information received from other components of system 100 regarding datasets. In various aspects, interface 522 may be configured to provide data or instructions received from other systems to components of system 100. For example, interface 522 may be configured to receive instructions for generating data models (e.g., type of data model, data model parameters, training data indicators, training parameters, or the like) from another system and provide this information to programs 535. As an additional example, interface 522 may be configured to receive data including sensitive data from another system (e.g., in a file, a message in a publication and subscription framework, a network socket, or the like) and provide that data to programs 535 or store that data in, for example, data 531, model storage 104, dataset database 106, and/or remote database 108.

In some embodiments, interface 522 may include a user interface configured to receive user inputs and provide data to a user (e.g., a data manager). For example interface 522 may include a display, a microphone, a speaker, a keyboard, a mouse, a track pad, a button a dial, a knob, a printer, a light, an LED, a haptic feedback device, a touchscreen and/or other input or output devices.

Memory 630 may be a volatile or non-volatile, magnetic, semiconductor, optical, removable, non-removable, or other type of storage device or tangible (i.e., non-transitory) computer readable medium, consistent with disclosed embodiments. As shown, memory 530 may include data 531, including one of at least one of encrypted data or unencrypted data. Consistent with disclosed embodiments, data 531 may include datasets, model data (e.g., model parameters, training criteria, performance metrics, etc.), and/or other data.

Programs 535 may include one or programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 535 may be written in one or more programming or scripting languages. One or more of such software sections or modules of memory 530 may be integrated into a computer system, non-transitory computer-readable media, or existing communications software. Programs 535 may also be implemented or replicated as firmware or circuit logic.

Programs 535 may include a model optimizer 536, an embedder a clusterer 538, and/or other components (e.g., modules) not depicted to perform methods of the disclosed embodiments. In some embodiments, modules of programs 535 may be configured to generate ("spin up") one or more ephemeral container instances (e.g., an AMAZON LAMBDA instance) to perform a task and/or to assign a task to a running (warm) container instance, consistent with disclosed embodiments. Modules of programs 535 may be configured to receive, retrieve, and/or generate models, consistent with disclosed embodiments. Modules of programs 535 may be configured to perform operations in coordination with one another. In some embodiments, programs 535 may be configured to conduct an authentication process, consistent with disclosed embodiments.

Model optimizer 536 may include programs (e.g., scripts, functions, algorithms) to train, implement, store, receive, retrieve, and/or transmit one or more machine-learning models. Machine-learning models may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Models may include an ensemble model (i.e., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. Model optimizer 536 may be configured to adjust model parameters during training. Model parameters may include weights, coefficients, offsets, or the like. Training may be supervised or unsupervised.

Model optimizer 536 may be configured to train machine learning models by optimizing model parameters and/or hyperparameters (i.e., hyperparameter tuning) using an optimization technique, consistent with disclosed embodiments. Hyperparameters may include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Model optimizer 636 may be configured to optimize statistical models using known optimization techniques.

In some embodiments, model optimizer 636 may be configured to generate models based on instructions received from another component of system 100 and/or a computing component outside system 100 (e.g., via interface 522, from client device 110, etc.). For example, model optimizer 536 may be configured to receive a visual (e.g., graphical) depiction of a machine learning model and parse that graphical depiction into instructions for creating, and training a corresponding neural network. Model optimizer 536 may be configured to select model training parameters. This selection can be based on model performance feedback received from another component of system 100. Model optimizer 536 may be configured to provide trained models and descriptive information concerning the trained models to model storage 104.

Model optimizer 536 may be configured to train data models to generate synthetic data based on an input dataset (e.g., a dataset comprising actual data). For example, model optimizer 536 may be configured to train data models to generate synthetic data by identifying and replacing sensitive information in a dataset. In some embodiments, model optimizer 636 may be configured to train data models to generate synthetic data based on a data profile (e.g., a data schema and/or a statistical profile of a dataset). For example, model optimizer 536 may be configured to train data models to generate synthetic data to satisfy a performance criterion. Performance criteria may be based on a similarity metric representing a measure of similarity between a synthetic dataset and another dataset.

Embedder 537 may include programs (e.g., scripts, functions, algorithms) to encode data, to classify data, and/or to cluster data, consistent with disclosed embodiments. Embedder 637 may include any embedding network layers as described herein. Embedding network layers may comprise machine learning models configured to classify data. For example, an embedding network layer may include a natural language processing model, a binary classification model, a convolutional neural network model, a deep learning model, a directional Encoder Representations from Transformers (BERT) model, an Embeddings from Language Models (ELMo) representation model, or any other model configured to classify data.

In some embodiments, embedder 537 may include programs to transform string data (e.g., character data or other non-numeric data) into numeric data (e.g., to transform letters, words, or other strings into numbers according to a table), embedder 537 may be configured to perform methods of character encoding (e.g., one-hot encoding). In some embodiments, embedder 537 may be configured to receive, train, and/or implement a machine learning model configured for natural-language processing a natural-language model). In some embodiments, embedder 537 may be configured to implement a natural-language model to encode string data as numeric data. For example, embedder 537 may transform, word s and/or phrases into numbers by applying a lexicon, a parser, and a grammar rule system. In some embodiments, embedder 537 may be configured to receive, train, and/or implement an autoencoder model or components of an autoencoder model (e.g., an encoder model or a decoder model). In some embodiments, embedder 537 may be configured to implement an autoencoder model to reduce the dimensionality of a dataset. Embedder 537 may be configured to tag classified and/or clustered data, consistent with d closed embodiments.

Embedder 537 may include programs configured to cluster data by analyzing properties of data and/or data models. For example, Embedder 537 may include or be configured to implement one or more data-profiling models. A data-profiling model may include machine-learning models and statistical models to determine a data schema and/or a statistical profile of a dataset (i.e., to profile a dataset), consistent with disclosed embodiments. A data-profiling model may include an RNN model, a CNN model, or other machine-learning model.

In some embodiments, embedder 537 may include algorithms to determine a data type, key-value pairs, row-column data structure, statistical distributions of information such as keys or values, or other property of a data schema may be configured to return a statistical profile of a dataset (e.g., using a data-profiling model). In some embodiments, embedder 537 may be configured to implement univariate and multivariate statistical methods. Embedder 537 may include a regression model, a Bayesian model, a statistical model, a linear discriminant analysis model, or other classification model configured to determine one or more descriptive metrics of a dataset. For example, embedder 537 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

In some embodiments, embedder 537 may be configured to return a statistical profile of a dataset (e.g., using a data-profiling model or other model). A statistical profile may, include a plurality of descriptive metrics. For example, the statistical profile may include an average, a mean a standard deviation, a range, a moment, a variance, a covariance, a covariance matrix, a similarity metric, or any other statistical metric of the selected dataset. In some embodiments, embedder 537 may be configured to generate a similarity metric representing a measure of similarity between data in a dataset. A similarity metric may be based on a correlation, covariance matrix, a variance, a frequency of overlapping values, or other measure of statistical similarity.

In some embodiments, embedder 537 may be configured to classify data. Classifying data may include determining whether a data sample is related to another data sample. Classifying a dataset may include clustering datasets and generating information indicating whether a dataset belongs to a cluster of datasets. In some embodiments, classifying a dataset may include generating data describing a dataset (e.g. a dataset index), including metadata, an indicator of whether data element includes actual data and/or synthetic data, a data schema a statistical profile a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as a node diagram, a tree diagram, or a vector diagram of datasets. Classifying a dataset may include estimating a likelihood that a dataset relates to another dataset, the likelihood being based on the similarity metric.

Embedder 537 may be configured to classify a dataset based on data-model output, consistent with disclosed embodiments. For example, embedder 537 may be configured to classify a dataset based on a statistical profile of a distribution of activation function values. In some embodiments, embedder 537 may be configured to classify a dataset at least one of an edge, a foreign key, a data schema, or a similarity metric, consistent with disclosed embodiments. In some embodiments, the similarity metric represents a statistical similarity between data-model output of a first dataset and a second dataset, consistent with disclosed embodiments. As another example, data classification module may classify a dataset as a related dataset based on determination that a similarity metric between a dataset and a previously classified dataset satisfies a criterion.

Clusterer 538 may include programs to encode data, to classify data, and/or to cluster data based on output of data classification models and/or data clustering models (i.e., based on preliminary clustered data). Clusterer 538 may be configured to receive, generate, train, and/or implement a meta-clustering model, consistent with disclosed embodiments. A meta-clustering model may include a machine learning model. For example, a meta-clustering model may include a deep learning model, a neural network model, an RNN, a CNN, a random forest model, a Support Vector Machine (SVM) model, a Density-based spatial clustering of applications with noise (DBSCAN) model, a k-means clustering model, a distribution-based clustering model, a k-medoids model, and/or any other type of machine learning model. A meta-clustering model may be trained to generate data clusters based on preliminary data clusters produced by embedding network layers.

In some embodiments, a meta-clustering model may be configured to encode data (e.g., using a principal component analysis). Encoding data may include a principal component analysis (PCA), an independent component analysis (ICA), a non-negative matrix factorization method (NMF), a Factor Analysis (FA), and/or any other algorithm to reduce dimensionality of latent variable generated by a model. In some embodiments, meta-clustering model may be configured to generate a data map of data based on preliminary data clusters generated by embedding network layers. Generating a data map may be supervised or unsupervised Generating a data map may include tracking data samples in a plurality of preliminary data clusters and determining relationships between the data samples. In some embodiments, meta-clustering mode may be configured to generate a data map based on encoded data. A meta-clustering model may be configured to identify a conflict between preliminary data clusters.

In some embodiments, a meta-clustering model may be configured to determine a performance metric of one or more embedding network layers. In some, embodiments, generating a data map, may be based on a performance metric. Meta-clustering model may be configured to determine a number of clusters based on a data map and/or a performance metric. Determining a number of clusters may be based on relationships (e.g., edge relationships) between data clusters. A meta-clustering model may be configured to determine a number of clusters by implementing methods such as a k-means algorithm, a k-medoids algorithm an elbow method, an X-means clustering method, an information criterion approach, a silhouette method, a cross-validation method, a method based on a kernel matrix, and/or any other methods of determining a number of clusters in data.

In some embodiments, a meta-clustering model may be configured to generate final data clusters. Generating final data clusters may be based on a data map. In some embodiments, generating final data clusters may include updating one or more embedding network layers by training the embedding network layers based on a number of clusters (e.g., a number of clusters determined based on a data map). In some embodiments, generating final data clusters may include generating updated data clusters using one or more updated embedding network layers. A final data cluster may include an updated data cluster generated by an updated embedding network layer.

In some embodiments, a meta-clustering model may be configured to repeatedly update one or more embedding network layers until a performance metric of the one or more embedding network layers is satisfied (i.e., meta-clustering model may train an embedding network layer). During individual rounds of training of an embedding network layer, a meta-clustering model may be configured to determine a number of clusters and train the embedding network layer based on the determined number of clusters (e.g., by specifying the number of clusters as a model parameter of the embedding network layer).

Figure 6:
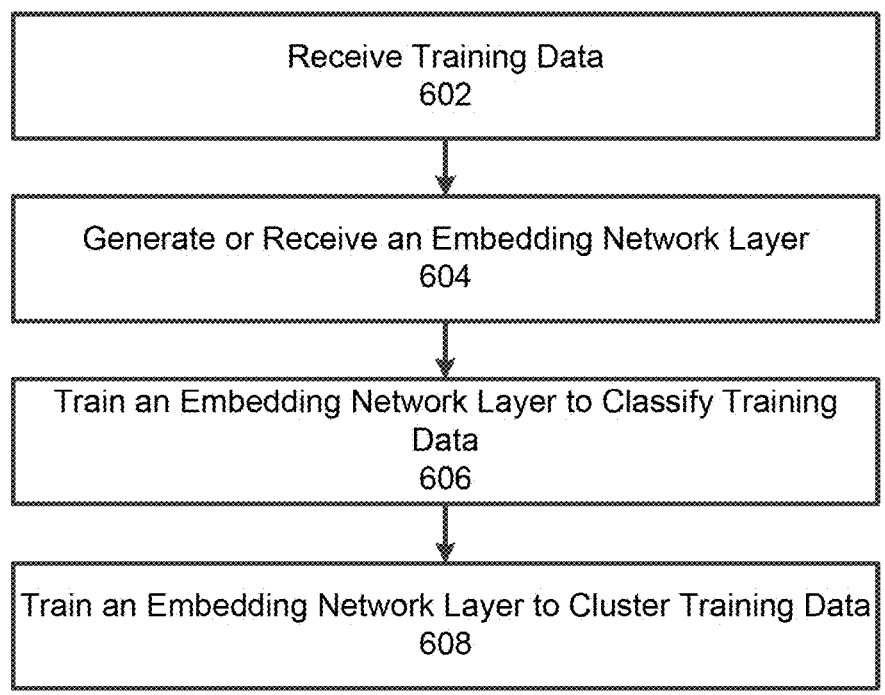
FIG. 6 depicts an exemplary process for training an embedding network layer to cluster data, consistent with disclosed embodiments.

FIG. 6 depicts exemplary process 600 for training an embedding network layer to cluster data, consistent with disclosed embodiments. In some embodiments, data-clustering system 102 may perform process 600 using programs 535. One or more of model optimizer 536, embedder 537, clusterer 538 or other components of programs 535 may perform operations of process 600, consistent with disclosed embodiments. It should be noted that other components of system 100, including, for example, client device 110 may perform operations of one or more steps of process 600.

Consistent with disclosed embodiments, steps of process 600 may be performed on one or more cloud services using one or more ephemeral container instances (e.g., AMAZON LAMBDA). For example, at any of the steps of process 600, data-clustering system 102 may generate (spin up) an ephemeral container instance to execute a task, assign a task to an already-running ephemeral container instance (warm container instance), or terminate a container instance upon completion of a task. As one of skill in the art will appreciate, steps of process 600 may be performed as part of an application interface (API) call.

At step 602, data-clustering system 102 may receive training data, consistent with disclosed embodiments. In some embodiments, step 602 may include receiving training data from data 531, one or more client devices (e.g., client device 110 dataset database 106, remote database 108, and/or a computing component outside system 100. Step 602 may include retrieving training data from a data storage (e.g., from data 531, dataset database 106, and/or remote database 108). Training data of step 602 may include any of the types of data previously described or any other type, of dataset. Training data of step 602 may have a range of dimensions, formats, data schema, and/or statistical profiles. Training data of step 602 may include time series data. Training data may include clustered data (e.g., a preliminary data cluster).

At step 604, data-clustering system 102 may generate or receive an embedding network layer, consistent with disclosed embodiments. Retrieving an embedding network layer may be based on received data (e.g., based on a data profile of a received dataset). Retrieving an embedding network layer may include retrieving a model from data 531, model storage 104, remote database 108, and/or another data storage.

At step 606, data-clustering system 102 may train an embedding network layer to classify training data, consistent with disclosed embodiments. Training an embedding network layer to classify data may include any method of model training (e.g., as described in reference to model optimizer 536). Classifying data at step 606 may include generating tags and/or any other method of classifying data. Step 606 may include training an embedding network to classify data based on training data (e.g., as described in reference to method 300, FIG. 3) and/or based on an output of another embedding network layer (e.g., as described in reference to method 400, FIG. 4).

At step 608, data-clustering system 102 may train an embedding network layer to cluster training data (i.e., to generate data clusters), consistent with disclosed embodiments (e.g., as described in reference to method 300, FIG. 3). Step 608 may include training an embedding network to cluster data based on an output of another embedding network layer (e.g., as described in reference to method 400, FIG. 4). Training an embedding network layer to cluster data may include any method of model training (e.g., as described in reference to model optimizer 536). Clustering data at step 608 may include generating tags, nodes, edges, and/or any other method of classifying data. Step 608 may include training an embedding network layer to generate preliminary data clusters (e.g., preliminary data clusters 306a, 306b, 306c, 306d, and/or 306n). In some embodiments, step 608 includes performing step 606 (i.e., classifying and clustering training data may be overlapping processes), consistent with disclosed embodiments. In some embodiments, preliminary data clusters may have a number of dimensions equal to a number of dimensions of training data.

Figure 7:
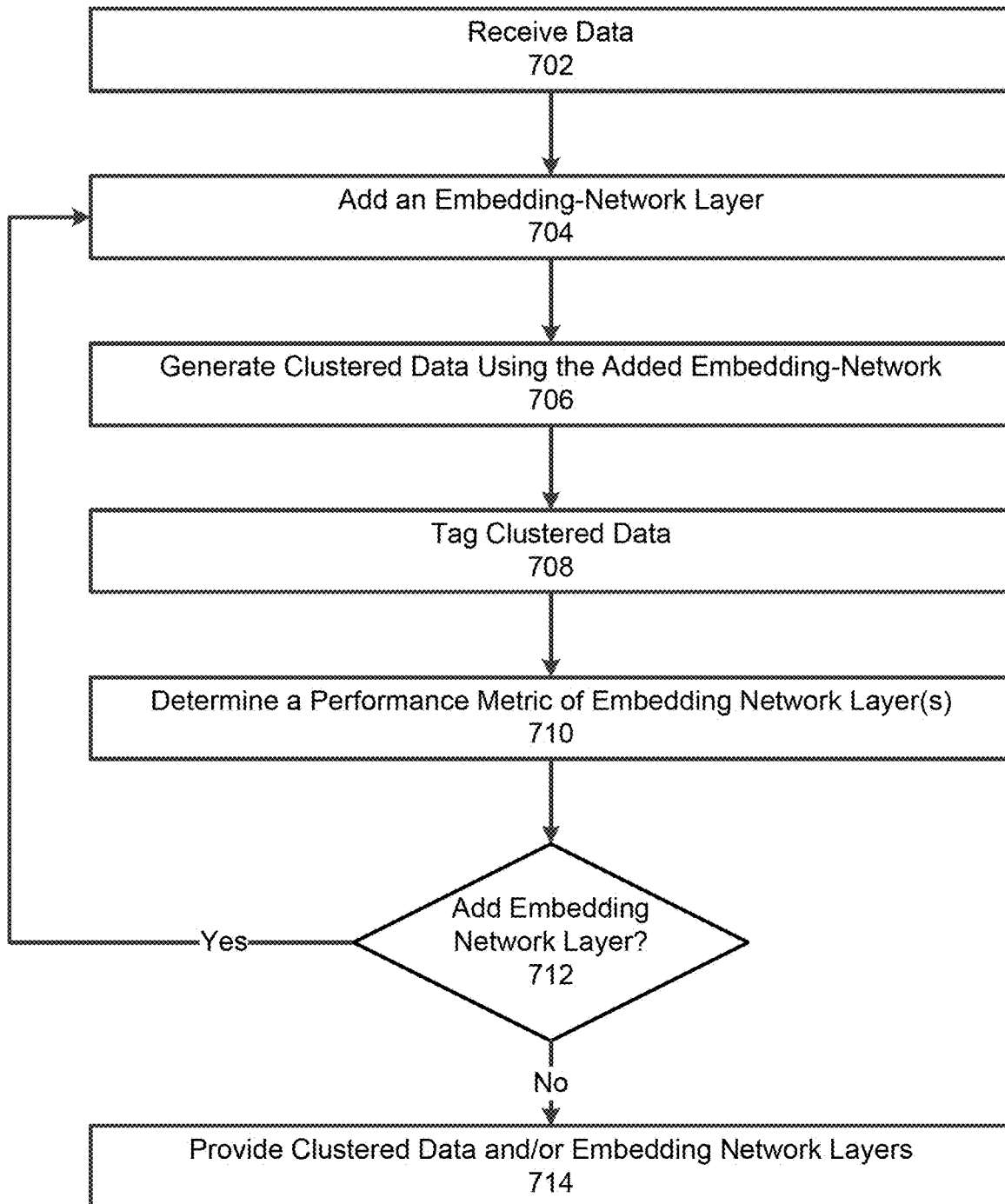
FIG. 7 depicts an exemplary process for clustering data using embedding network layers, consistent with disclosed embodiments.

FIG. 7 depicts exemplary process 700 for clustering data using embedding network layers, consistent with disclosed embodiments. Process 700 may be performed to generate a plurality of embedding network layers (e.g., as described in relation to FIG. 3, 4, 8 or 8). In some embodiments, process 700 is directed by a meta-clustering model or other component of cluster 538.

In some embodiments, data-clustering system 102 may perform process 700 using programs 535. One or more of model optimizer 536, embedder 537, clusterer 538, anchor other components of programs 535 may perform operations of process 700, consistent with disclosed embodiments. It should be noted that other components of system 100, including, for example, client device 110 may perform operations of one or more steps of process 700.

Consistent with disclosed embodiments, steps of process 700 may be performed on one or more cloud services using one or more ephemeral container instances (e.g., AMAZON LAMBDA). For example, at any of the steps of process 700, data-clustering system 102 may generate (spin up) an ephemeral container instance to execute a task, assign a task to an already-running ephemeral container instance (warm container instance), or terminate a container instance upon completion of a task. As one of skill in the art will appreciate, steps of process 700 may be performed as part of an application interface (API) call.

At step 702, data-clustering system 102 may receive data, consistent with disclosed embodiments. Data received at step 702 may include any type of data in, any format, with any number of dimensions, as previously described. In some embodiments, data-clustering system 102 may receive training parameters or hyperparameters at step 702. In some embodiments, data-clustering system 102 may receive an identifier of an embedding network layer or a selection criterion for selecting an embedding network layer at step 702.

At step 704, data-clustering system 102 may add an embedding network layer, consistent with disclosed embodiments. In some embodiments, adding an embedding network layer may include adding a first embedding network layer to a plurality of embedding network layers (e.g., embedding network layers 304a, 304b, 304c, 304d, and 304n as depicted in FIG. 3). As previously described, an embedding network layer may include a machine learning model trained to classify anchor cluster data. In some embodiments, adding an embedding network layer includes selecting and retrieving an embedding network layer from a model storage based on an identifier or a selection criterion.

At step 706, data-clustering system 102 may generate clustered data using the added embedding network layer, consistent with disclosed embodiments. Generating clustered data may include performing any methods of data classification or data clustering, consistent with disclosed embodiments. In some embodiments, generating clustered data at step 706 includes training an added embedding-network (e.g., by performing steps, of process 600). In some embodiments, generating clustered data at step 706 includes implementing a trained, added embedding-network. Clustered data may include a number of dimensions which may be the same as a number of dimensions of received data. Step 706 may include generating clustered data using, for example, method 300 or method 400 (FIG. 3, FIG. 4).

At step 708, data-clustering system 102 may tag clustered data, consistent with disclosed embodiments. Tagging clustered data may include providing data samples to a user (e.g., via interface 522 or by transmitting data samples) and receiving data tags in response. In some embodiments, generating clustered data and tagging clustered data may be performed concurrently (i.e., steps 606 and 608 may be performed at the same time as part of a single process).

At step 710, data-clustering system 102 may determine a performance metric of one or more embedding network layers, consistent with disclosed embodiments. For example, a performance metric may be based on a measure of intra-cluster variance as compared to an inter-cluster variance in clustered data. A ratio of intra-cluster variance to inter-cluster may indicate how well an embedding network layer classifies data. A high ratio may indicate inaccurate data classification, while a low ratio may indicate accurate data classification. The performance metric at step 710 may be based on a plurality of individual performance metrics associated with individual embedding network layers (e.g., an average, a maximum of a performance metrics etc.). A performance metric at step 710 may be based on a comparison of the number of clusters generated by a plurality of embedding network layers (e.g., a variance, a percent agreement, etc.). A high variance or low percent agreement may indicate that inaccurate data classification, while a low variance or high percent agreement may indicate accurate data classification. A performance metric at step 710 may be based on, a k-means algorithm, a k-medoids algorithm, an elbow method, an X-means clustering method, an information criterion approach, a silhouette method, a cross-validation method, a method based on a kernel matrix, and/or any other methods of determining a number of clusters in data.

In some embodiments, a meta-clustering model determines a performance criterion at step 710. In some embodiments, a performance criterion may be a threshold based on one or more performance metrics of embedding network layers. A threshold may be based on an average or any other statistical measure of one or more performance metrics of embedding network layers. For example, a performance criterion at step 710 may be based on a minimum performance metric (e.g., the performance criterion may include determining whether at least one embedding network layer meets a minimum performance metric).

At step 712, data-clustering system 102 may determine whether to add an embedding network layer, consistent with disclosed embodiments. Determining at step 712 may be based on a performance criterion (e.g., a performance criterion of step 710). For example, if the performance criterion indicates disagreement or inaccurate classifications among the plurality of embedding network layers, data-clustering system 102 may determine to add an embedding layer. Conversely, if the performance criterion indicates agreement or accurate classification data-clustering system 102 may determine to not add an embedding layer. In some embodiments, determining at step 712 may be based on a predetermined number of network layers. Determining at step 712 may be based on an input (e.g., a manual input received via interface 522 and/or an input received from client device 110). Determining at step 712 may be based on data received at step 702 (e.g a list of embedding network layer identifiers).

As shown, data-clustering system 102 may repeat steps 604 through 610 if data-clustering system 102 determines to add another embedding network layer (i.e., if the determination at step 712 is "yes"). Alternatively, data-clustering system 102 may proceed to step 714 if data-clustering system 102 determines not to add another embedding network layer (i.e., if the determination at step 712 is "no").

At step 714, data-clustering system 102 may provide clustered data and/or embedding network layers, consistent with disclosed embodiments. Providing clustered data may include storing data (e.g., in data 531, dataset database 106, and/or remote database 108). Providing clustered data may include transmitting a data to another component of system 100 (e.g., client device 110) and/or a component outside system 100. Providing clustered data may include displaying a visual representation of clustered data in an interface (e.g., interface 522), such as a table, a graph, a node diagram, etc.

Providing an embedding network layer may include storing an embedding network layer (e.g., in data 531 and/or model storage 104). Providing an embedding network layer may include transmitting an embedding network layer to another component of system 100 (e.g., client device 110) and/or a component outside system 100. Providing embedding network layers may include displaying a visual representation of networks layers in an interface (e.g., interface 522), such as a table, a graph, etc.

Figure 8:
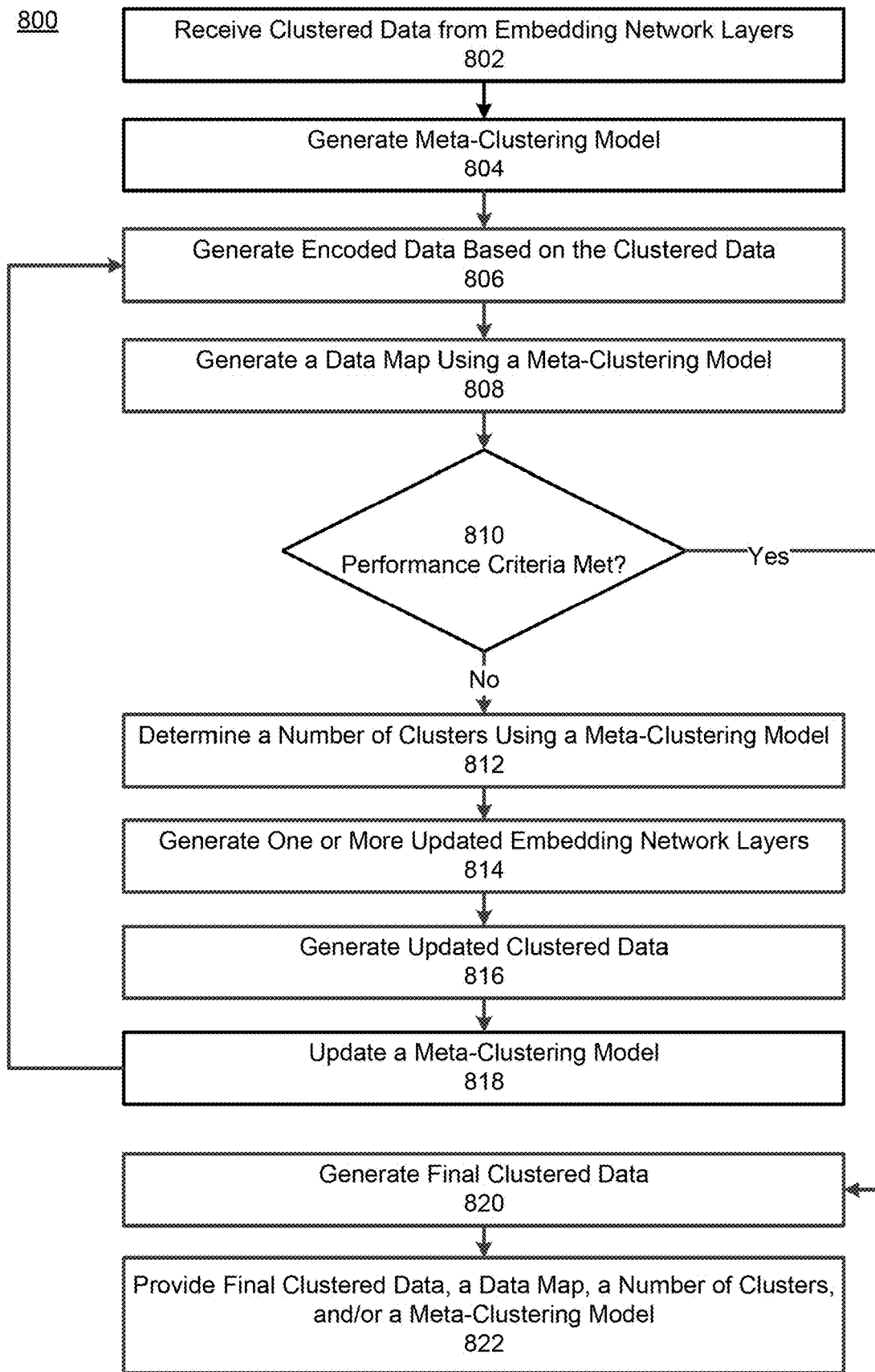
FIG. 8 depicts an exemplary process for training a meta-clustering model to cluster data, consistent with disclosed embodiments.

FIG. 8 depicts exemplary process 800 for training a meta-clustering model to cluster data, consistent with disclosed embodiments. In some embodiments, data-clustering system 102 may perform process 800 using programs 535. One or more of model optimizer 536, embedder 537, clusterer 538, and/or other components of programs 535 may perform operations of process 800, consistent with disclosed embodiments. It should be noted that other components of system 100, including, for example, client device 110 may perform operations of one or more steps of process 800.

Consistent with disclosed embodiments, steps of process 800 may be performed on one or more cloud services using one or more ephemeral container instances (e.g., AMAZON LAMBDA). For example, at any of the steps of process 800, data-clustering system 102 may generate (spin up) an ephemeral container instance to execute a task, assign a task to an already-running ephemeral container instance (warm container instance), or terminate a container instance upon completion of a task. As one of skill in the art will appreciate, steps of process 800 may be performed as part of an application interface (API) call.

At step 802, data-clustering system 102 may receive clustered data from a plurality of embedding network layers, consistent with, disclosed embodiments. Clustered data may include node-edge data and/or any other classified and/or clustered data. Clustered data received at step 802 may include preliminary clustered data and/or updated clustered data, as described herein. Clustered data may have a number of dimensions, consistent with disclosed embodiments.

At step 804, data-clustering system 102 may generate a meta-clustering model, consistent with disclosed embodiments. A meta-clustering model may include a deep learning model, a neural network model, an RNN, a CNN, a random forest model, a Support Vector Machine (SVM) model, a Density-based spatial clustering of applications with noise (DBSCAN) model, a k-means clustering model, a distribution-based clustering model, a k-medoids model, and/or any other type of machine learning model. Generating a meta-clustering model may include retrieving a model from a data storage (e.g., data 631 and/or model storage 104), consistent with disclosed embodiments. Retrieving a model may be based on user input, data received at step 802, and/or a search strategy.

At step 806, data-clustering system 102 may generate encoded data based on the clustered data, consistent with disclosed embodiments. Generating encoding data may include performing an encoding method. The encoding method may include a principal component analysis, an independent component analysis (ICA), a non-negative matrix factorization method (NMF), a Factor Analysis (FA) and/or any other algorithm to reduce dimensionality of a latent variable generated by a model. In some embodiments, a meta-clustering model generates encoded data at step 806.

At step 808, data-clustering system 102 may generate a data map using a meta-clustering model, consistent with disclosed embodiments. The data map may be based on clustered data (e.g., preliminary data clusters) and/or on encoded data (e.g., principal components of the preliminary data clusters). In some embodiments, generating a data map may be unsupervised. In some embodiments, generating a data map may include tracking data samples in a plurality of data clusters and determining relationships between the data samples. In some embodiments, generating a data map may be supervised. For example, generating a data map may include providing data samples to a user and receiving user feedback. At step 808, meta-clustering model may identify a conflict between preliminary data clusters generated by different embedding network layers. Data-clustering system 102 may request user feedback based on a conflict. In some embodiments, a data map may include a representation of a data sample in a latent space comprised of a number of dimensions (e.g., a number of dimensions may be equal to a number of layers of an embedding network). In some embodiments, a dimension may correspond to a vector associated with neural nodes of an embedding network layer (e.g., a vector of weights activation function values, etc.).

At step 810, data-clustering system 102 may determine whether a performance criterion is met, consistent with disclosed embodiments. In some embodiments, at step 810, a meta-clustering model determines a performance metric and determines whether a performance criterion is met based on the performance metric. Data-clustering system 102 may determine a performance metric of one or or embedding network layers, consistent with disclosed embodiments. For example, a performance metric may be based on a measure of intra-cluster variance as compared to an inter-cluster variance in clustered data. A ratio of intra-cluster variance to inter-duster may indicate how well an embedding network layer classifies data. A high ratio may indicate inaccurate data classification, while a low ratio may indicate accurate data classification. The performance metric at step 810 may be based on a plurality of individual performance metrics associated with individual embedding network layers (e.g., an average, a maximum of a performance metrics etc.). A performance metric at step 810 may be based on a comparison of the number of clusters generated by a plurality of embedding network layers (e.g., a variance, a percent agreement, etc.). A high variance or low percent agreement may indicate that inaccurate data classification while a low variance or high percent agreement may indicate accurate data classification. A performance criterion may include a threshold of a performance metric. In some embodiments, a meta-clustering model is trained to identify a performance criterion.

As shown, in some embodiments, if the performance criterion is met (i.e., if the determination at step 810 is "yes"), step 820 follows step 810. In some embodiments, if the performance criterion is not met (i.e., if the determination at step 810 is "no"), one or more of steps 712 through 718 follows step 810.

At step 812, data-clustering system 102 may determine a number of clusters using a meta-clustering model, consistent with disclosed embodiments. In some embodiments, determining a number of clusters may be based on a data map and/or a performance metric. Determining a number of clusters may be based on relationships (e.g., edge relationships) between data clusters. In some embodiment step 812 includes implementing a meta-clustering model trained to determine a number of clusters that, optimizes a property of clustered data (e.g. trained to optimize a measure of variance of a duster, a ratio of intra-cluster variance to inter-cluster variance, etc.). At step 812, data-clustering system 102 may determine a number of clusters by implementing methods such as a k-means algorithm, a k-medoids algorithm, an elbow method, an X-means clustering method, an information criterion approach, a silhouette method, a cross-validation method, a method based on a kernel matrix, and/or any other methods of determining a number of clusters in data.

At step 814, data-clustering system 102 may generate one or more updated embedding network layers, consistent with disclosed embodiments. Step 814 may include generating an updated embedding network layer by training the embedding network layer based on a number of clusters. Step 814 may include performing steps of process 600 and/or process 700. Step 814 may include adding an embedding network layer, consistent with disclosed embodiments. Step 814 may include generating one or more updated embedding network layers as described in reference to method 300 (FIG. 3) and/or as described in reference to method 400 (FIG. 4).

At step 816, data-clustering system 102 may include generating updated cluster data, consistent with disclosed embodiments. Step 816 may include implementing one or more network embedding layers to generate updated clustered data, including implementing an updated embedding network layer. Step 816 may include generating updated cluster data as described in reference to method 300 (FIG. 3) and/or as described in reference to method 400 (FIG. 4).

At step 818, data-clustering system 102 may update a meta-clustering models consistent with disclosed embodiments. In some embodiments, step 818 includes updating model parameters based on updated cluster data. In this way, a meta-clustering model may be trained to optimize data clusters based on a number of clusters and/or other parameters. Step 818 may include repeatedly updating one or more embedding network layers until a performance metric of the one or more embedding network layers is satisfied.

As shown in FIG. 8, step 806 and/or step 808 may follow step 818. In some embodiments, data-clustering system 102 may repeat steps 706, 708, 710, 712, 714, 716, and/or 718 to train the meta-clustering model to determine a number of clusters based on the data map and a performance criterion, consistent with disclosed embodiments.

At step 820, data-clustering system 102 may generate final clustered data, consistent with disclosed embodiments. In some embodiments, meta-clustering model may generate final data clusters based on a data map. In some embodiments, final clustered data may be the same as the data map. In some embodiments, generating final clustered data (i.e., final data clusters) may include an updated data cluster generated by an updated embedding network layer. In some embodiments, generating final clustered data may include selecting a data cluster generated by an embedding network layer. For example, data-clustering system 102 may select preliminary clustered data or updated clustered data based on a performance metric of an embedding network layer. Final clustered data may have a number of dimensions, which may be equal to a number of embedding layers multiplied by a number of dimensions of clustered data and/or encoded data.

At step 822, data-clustering system 102 may provide final clustered data, a data map, a number of clusters, and/or a meta-clustering model, consistent with disclosed embodiments. Providing final clustered data, a data map, a number of clusters, and/or a meta-clustering model may include storing data (e.g., in data 531, model storage 104, dataset database 106, and/or remote database 108). Providing final clustered data, a data map, a number of clusters, and/or a meta-clustering model may include transmitting a data to another component of system 100 (e.g., client device 110) and/or a component outside system 100. Providing final clustered data, a data map, a number of clusters, and/or a meta-clustering model may include displaying a visual representation of final clustered data, a data map, a number of clusters, and/or a meta-clustering model in an interface (e.g., interface 522), such as a table, a graph, a node diagram, etc.

Figure 9:
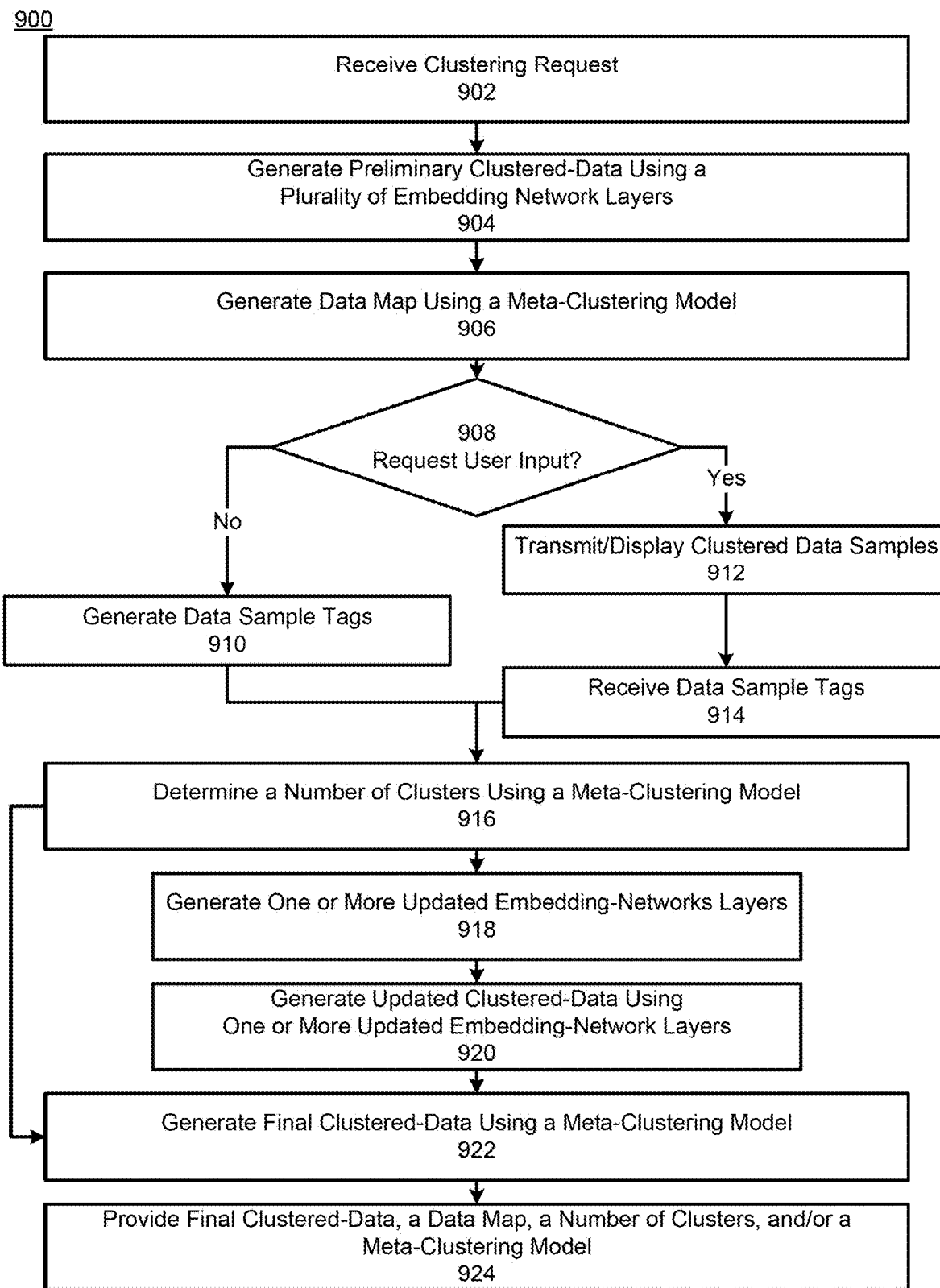
FIG. 9 depicts an exemplary process for clustering data using a meta-clustering model, consistent with disclosed embodiments.

FIG. 9 depicts exemplary process 900 for clustering, data using, a meta-clustering model, consistent with disclosed embodiments. In some embodiments, data-clustering system 102 may perform process 900 using programs 535. One or more of model optimizer 536, embedder 537, clusterer 538, and/or other components of programs 535 may perform operations of process 900, consistent with disclosed embodiments. It should be noted that other components of system 100, including, for example, client device 110 may perform operations of one or more steps of process 900.

Consistent with disclosed embodiments, steps of process 900 may be performed on one or more cloud services using one or more ephemeral container instances (e.g., AMAZON LAMBDA). For example, at any of the steps of process 900, data-clustering system 102 may generate (spin up) an ephemera container instance to execute a task, assign a task to an already-running ephemeral container instance (warm container instance), or terminate a container instance upon completion of a task. As one of skill in the art will appreciate, steps of process 900 may be performed as part of an application interface (API) call.

At step 902, data-clustering system 102 may receive a clustering request, consistent with disclosed embodiments A clustering request may include date (e.g., data to be clustered). A clustering request may include clustered data. A clustering request may include a n identifier of an embedding network layer and/or a meta-clustering model. A clustering request may include tags or other classification data. Data received at step 902 may include any type of data with any number of dimensions, consistent with disclosed embodiments.

At step 904, data-clustering system 102 may generate preliminary clustered-data based on received data using a plurality of embedding network layers, consistent with disclosed embodiments Preliminary clustered-data may have a number of dimensions. Generating preliminary clustered-data may include performing steps of process 600 and/or process 700. Step 904 may include generating preliminary clustered-data as described in reference to method 300 (FIG. 3) and/or as described in reference to method 400 (FIG. 4).

At step 906, data-clustering system 102 may generate a data map using a meta-clustering model, consistent with disclosed Generating a data map ma y include any of the methods of generating a data map previously described. Generating a data map may include encoding preliminary clustered data, consistent with disclosed embodiments.

At step 908, data-clustering system 102 may determine whether to request user input, consistent with disclosed embodiments. For example, data-clustering system 102 may determine to request user input to classify (e.g., tag) a data sample. Determining whether to request user input may be based on a predetermined command (e.g., a command to perform a supervised or unsupervised model training).

As shown, data-clustering system 102 may perform step 910 if data-clustering system 102 determines not to request user input (i.e., if the determination at step 908 is "no"). Alternatively, data-clustering system 102 may perform step 912 and/or step 914 if data-clustering system 102 determines to request user input (i.e., if the determination at step 908 is "yes").

At step 910, data-clustering system 102 may generate data sample tags, consistent with disclosed embodiments. In some embodiments, generating data sample based on preliminary data-clusters and/or a data map (e.g. data samples may be tagged (classified) based on learned classifications of the meta-clustering model, the learned classifications being based on preliminary data-clusters and/or a data map). Step 910 may include unsupervised data tagging (i.e., tagging without user input).

At step 912, data-clustering system 102 may transmit clustered data samples to client device 110 and/or display clustered data samples at interface 622, consistent with disclosed embodiments. For example, data-clustering system 102 may transmit and/or display a data sample with a query for user input to identify a data classification category and/or a data tag associated with the data sample (e.g., to label an image as containing an object class such as a "hairless cat").

At step 914, data-clustering system 102 may receive data sample tags, consistent with disclosed embodiments. Receiving data sample tags may be based on user input received from client device 110 and/or via interface 522. Data samples received at step 914 may correspond to data samples transmitted and/or displayed at step 912.

At step 916, data-clustering system 102 may determine a number of clusters using a meta-clustering model, consistent with disclosed embodiments. Determining a number of clusters may include performing any of the methods of determining a number of clusters as previously described.

In some embodiments, step 922 follows step 916. For example, if the number of clusters as determined by a meta-clustering model matches a number of clusters of a preliminary data cluster, step 922 may follow step 916. As another example, if a performance criterion of the preliminary data clusters is met, step 922 may follow step 916.

At step 918, data-clustering system 102 may generate one or more updated embedding network layers, consistent with disclosed embodiments. Step 918 may include implementing steps of process 700. Step 918 may include repeatedly updating an embedding network layer until a performance criterion is met. Step 918 may include generating one or more updated embedding network layers as described in reference to method 300 (FIG. 3) and/or as described in reference to method 400 (FIG. 4).

At step 920, data-clustering system 102 may generate updated clustered-data using one or more updated embedding network layers, consistent with disclosed embodiments. Step 920 may include any of the methods of generating updated clustered-data previously described. Step 920 may include generating updated clustered-data as described in reference to method 300 (FIG. 3) and/or as described in reference to method 400 (FIG. 4).

At step 922, data-clustering system 102 may generate final clustered-data using a meta-clustering model, consistent with disclosed embodiments. Step 922 may include any of the methods of generating final clustered-data previously described. Final clustered-data may include a number of dimensions, consistent with disclosed embodiments.

At step 924, data-clustering system 102 may provide final clustered data, a data map, a number of clusters, and/or a meta-clustering model, consistent with disclosed embodiments. Providing final clustered data, a data map, a number of clusters, and/or a meta-clustering model may include any of the previously described methods of providing final clustered data, a data map, a number of clusters, and/or a meta-clustering model.

Figure 10:
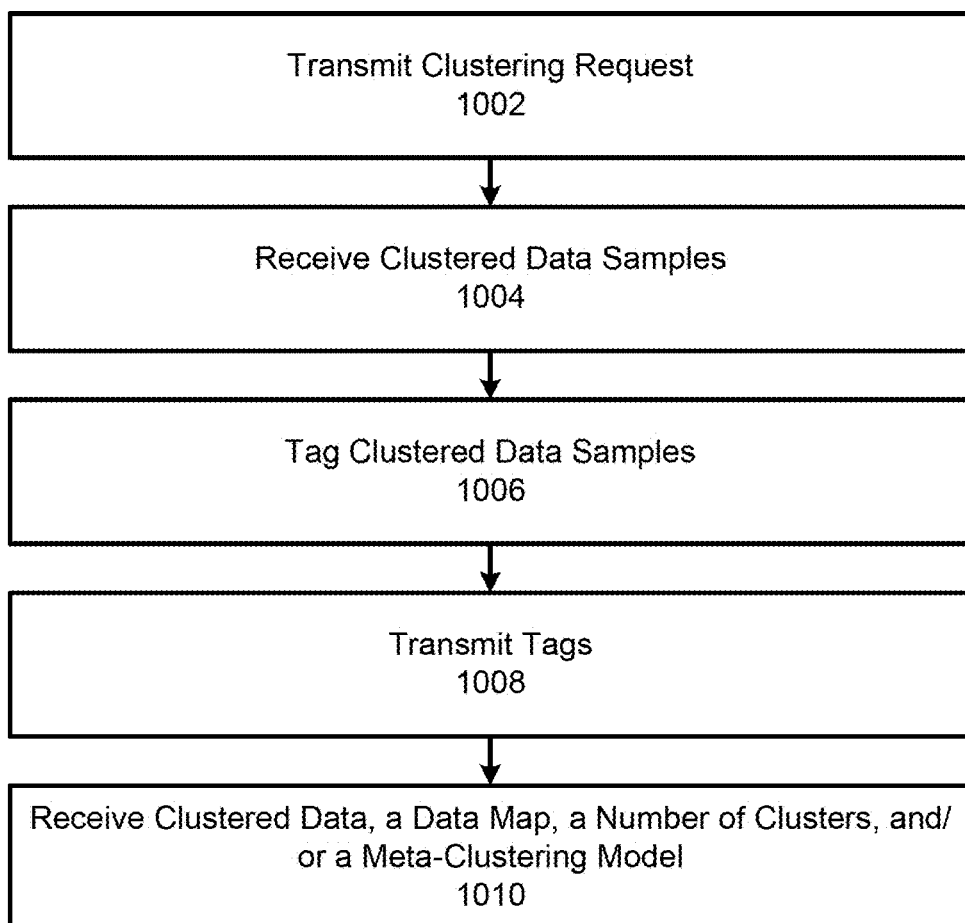
FIG. 10 depicts an exemplary process for supervising data clustering by a metal-clustering model, consistent with disclosed embodiments.

FIG. 10 depicts an exemplary process to supervise data clustering by a meta-clustering model, consistent with disclosed embodiments. In some embodiments, client device 110 may perform steps of process 1000. In some embodiments, client device 110 may be connected to data-clustering system 102 to perform steps of process 1000. In some embodiments, client device 110 may be a component of data clustering system 102 and perform steps of process 1000. and It should be noted that other components of system 100, including, for example, data-clustering system 102 may perform operations of one or more steps of process 1000.

At step 1002, client device 110 may transmit a clustering request to data-clustering system 102, consistent with disclosed embodiments. A clustering request may include data (e.g., data to be clustered). A clustering request may include clustered data. A clustering request may include an identifier of an embedding network layer and/or a meta-clustering model. A clustering request may include tags or other classification data. Data transmitted at step 1002 may include any type of data with any number of dimensions, consistent with disclosed embodiments.

At step 1004, client device 110 may receive clustered data samples from data-clustering system 102, consistent with disclosed embodiments. Clustered data samples may include embedding network layer output. Clustered data samples may include preliminary and/or final clustered data.

At step 1006, client device 110 may tag clustered data samples, consistent with disclosed embodiments. Tagging a clustered data sample may include providing text data, numeric data, and/or any other data associated with the clustered data samples. A tag may be associated with a category or class of data.

At step 1008, client device 110 may transit tags, consistent with disclosed embodiments. Transmitting tags may include transmitting tags to data-clustering system 102, dataset database 106, and/or remote database 108.

At step 1010, client device 110 may receive clustered data, a data map, a number of dusters, and/or a meta-clustering model, consistent with disclosed embodiments. Receiving clustered data, a data map, a number of dusters, and/or a meta-clustering model may include receiving data from data-clustering system 102.

Systems and methods disclosed herein involve unconventional improvements over conventional approaches to synthetic data generation. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be, designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for clustering data, comprising:
one or more memory units storing instructions; and
one or more processors configured to execute the instructions to perform operations comprising:

receiving data from a database;
generating, using a plurality of embedding network layers, preliminary data clusters based on the received data;
generating, using a meta-clustering model, final clustered data based on the preliminary data clusters; and
storing the final clustered data.

2. The system of claim 1, the operations further comprising:
generating an updated embedding network by training an embedding network layer of the embedding network layers; and
generating, using the updated embedding-network, updated clustered data based on the received data.

3. The system of claim 1, the operations further comprising:
determining, using the meta-clustering model, a number of clusters based on the received data.

4. The system of claim 3, the operations further comprising:
transmitting clustered data samples to a client device configured to generate a user interface that receives tags from a user, the clustered data samples being based on the clustered data; and
receiving, from the client device, tags associated with the clustered data samples; and wherein determining the number of clusters comprises determining the number of clusters based on the tags.

5. The system of claim 1, the operations further comprising:
sending, to the client device for display on the user interface, at least one of:
the final clustered data;
a visual representation of the final clustered data;
the number of clusters; or
the meta-clustering model.

6. The system of claim 1, the operations further comprising:
generating clustered data samples based on the preliminary data clusters; and
generating tags associated with the clustered data samples using the meta-clustering model,
wherein determining the number of clusters is based on the tags.

7. The system of claim 1, wherein generating preliminary data clusters comprises:
receiving training data;
generating one of the embedding network layers;
training the generated embedding network layer to classify training data; and
training the generated embedding network layer to cluster training data.

8. The system of claim 1, wherein generating preliminary data clusters comprises repeating generating steps until a performance criterion is satisfied, the generating steps comprising:
adding a trained embedding network layer to the plurality of embedding network layers;
generating clustered data using the added embedding-network layer;
tagging the clustered data; and
determining whether a performance criterion of the embedding networks is satisfied.

9. The system of claim 1, the operations further comprising:
generating the meta-clustering model;
reducing a dimensionality of the clustered data;
generating, using the meta-clustering model, encoded data based on the reduced-dimensionality clustered data;
generating a data map based on the encoded data; and
training the meta-clustering model to determine a number of clusters based on the data map and a performance criterion.

10. The system of claim 8, wherein generating, using the meta-clustering model, final clustered data is further based on the number of clusters.

11. The system of claim 8, wherein training the meta-clustering model comprises iteratively repeating training steps until the performance criterion is satisfied, the training steps comprising:
determining, using the meta-clustering model, a number of clusters based on the data map;
generating an updated embedding network based on the number of clusters;
generating updated clustered-data using the updated embedding network;
updating the meta-clustering model;
reducing a dimensionality of the updated clustered data;
generating, using the updated meta-clustering model, updated encoded data based on the reduced-dimensionality updated clustered data;
generating an updated data map based on the updated encoded data; and
determining whether the performance criterion is satisfied based on the updated data map.

12. The system of claim 1, wherein the data comprises image data and the embedding network layer comprises a convolutional neural network.

13. The system of claim 1, wherein the data comprises text data and the embedding network layers comprise a language representation model.

14. The system of claim 1, wherein the embedding network layers comprise at least one of a Bidirectional Encoder Representations from Transformers (BERT) model or an Embeddings from Language Models (ELMo) representation model.

15. The system of claim 1, wherein the meta-clustering model comprises a deep learning model.

16. The system of claim 3, wherein the number of clusters is larger than a maximum count of clusters in the preliminary data clusters.

17. The system of claim 1, wherein generating preliminary data clusters comprises performing a binary classification.

18. The system of claim 1, wherein generating preliminary data clusters comprises performing one-hot encoding.

19. A method for clustering data, comprising:
receiving data from a database;
generating, using a plurality of embedding network layers, preliminary data clusters based on the received data;
generating, using a meta-clustering model, final clustered data based on the preliminary data clusters; and
storing the final clustered data.

20. A system for clustering data comprising:
one or more memory units storing instructions; and
one or more processors configured to execute the instructions to perform operations comprising:
generating preliminary data clusters using a plurality of embedding network layers by repeating steps until a performance criterion is satisfied, the steps comprising:

adding a trained embedding network layer;
generating clustered data using the trained embedding network layer;
tagging the clustered data; and
determining whether a performance criterion of the embedding network layers is satisfied;
reducing a dimensionality of the clustered data;
generating, using a meta-clustering model, encoded data based on the reduced-dimensionality clustered data;
generating a data map based on the encoded data; and
generating, using the meta-clustering model, final clustered data based on the data map.

* * * * *